United States Patent
Kung et al.

(10) Patent No.: US 9,244,554 B2
(45) Date of Patent: Jan. 26, 2016

(54) TOUCH SENSING FILM STRUCTURE

(71) Applicant: INDUSTRIAL TECHNOLOGY RESEARCH INSTITUTE, Hsinchu (TW)

(72) Inventors: Chen-Pang Kung, Taoyuan County (TW); Hui-Lung Kuo, Taipei (TW); Shu-Hsing Lee, Hsinchu (TW); Cheng-Chung Lee, Hsinchu (TW); Mei-Chih Peng, Taoyuan County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 65 days.

(21) Appl. No.: 14/161,164

(22) Filed: Jan. 22, 2014

(65) Prior Publication Data

US 2014/0204291 A1 Jul. 24, 2014

(30) Foreign Application Priority Data

Jan. 22, 2013 (TW) ............................ 102102358 A

(51) Int. Cl.
*G06F 3/041* (2006.01)
(52) U.S. Cl.
CPC ...... *G06F 3/041* (2013.01); *G06F 2203/04102* (2013.01)
(58) Field of Classification Search
CPC ................... G06F 2203/04111; G06F 3/041
See application file for complete search history.

(56) References Cited

U.S. PATENT DOCUMENTS

| | | | |
|---|---|---|---|
| 6,395,863 B2 | 5/2002 | Geaghan | |
| 7,106,307 B2 | 9/2006 | Cok | |
| 7,705,923 B2 | 4/2010 | Jeong et al. | |
| 8,142,250 B2 | 3/2012 | Chien et al. | |
| 2008/0150901 A1 | 6/2008 | Lowles et al. | |
| 2010/0159792 A1 | 6/2010 | Visser et al. | |
| 2010/0214264 A1 | 8/2010 | Kuo et al. | |
| 2010/0265207 A1* | 10/2010 | Chen ............................ | 345/174 |
| 2011/0169767 A1 | 7/2011 | Weindorf et al. | |

FOREIGN PATENT DOCUMENTS

| | | |
|---|---|---|
| CN | 200944170 Y | 9/2007 |
| TW | 200428268 A | 12/2004 |
| TW | 201039218 A1 | 11/2010 |
| TW | 201039304 A1 | 11/2010 |
| TW | I374299 B | 10/2012 |

OTHER PUBLICATIONS

Taiwanese Office Action dated Jan. 6, 2015.
(Continued)

*Primary Examiner* — Gerald Johnson
(74) *Attorney, Agent, or Firm* — Rabin & Berdo, P.C.

(57) ABSTRACT

A touch sensing film structure including a touch-sensitive device layer, a water/oxygen barrier layer and a flexible substrate is provided. The touch-sensitive device layer has a first surface and a second surface opposite to the first surface. The water/oxygen barrier layer is formed on the first surface or the second surface or integrated with the touch-sensitive device layer to form a multi-function layer. The flexible substrate can stack with the water/oxygen barrier layer and the touch-sensitive device layer, or stack with the multi-function layer.

16 Claims, 43 Drawing Sheets

(56) References Cited

OTHER PUBLICATIONS

Yi-Pai Huang et al., "Eco-Displays: The Color LCD's Without Color Filters and Polarizers" Journals of Display Technology, vol. 7, No. 12, pp. 630-632, Dec. 2011.

Ik-Seok Yang el al., "A Touch Controller Using Differential Sensing Method for On-Cell Capacitive Touch Screen Panel Systems" IEEE Transactions on Consumer Electronics, vol. 57, Issue 3, pp. 1027-1032, Aug. 2011.

Wen-Chun Wang et al., "The Structure and Driving Method of Multi-Touch Resistive Touch Panel" SID Symposium Digest of Technical Papers, vol. 41, Issue 1, pp. 541-543, May 2010.

Sheng-Zeng Peng et al., "A Novel Design for Internal Touch Display" SID Symposium Digest of Technical Papers, vol. 40, Issue 1, pp. 567-569, Jun. 2009.

Dukhyun Choi et al., "Piezoelectric touch-sensitive flexible hybrid energy harvesting nanoarchitectures" Nanotechnology 21, pp. 1-6, Jun. 2010.

Hung-Hsiang Chen et al., "An Integrated Touch Controller Design for Electromagnetic and Capacitive Touch Technologies" IDW 11, pp. 417-420, 2011.

* cited by examiner

101

| touch-sensitive device layer containing the water/oxygen barrier layer | ~210a |
|---|---|
| flexible substrate | ~250 |

| water/oxygen barrier layer containing the touch-sensitive device layer | ~220a |
|---|---|
| flexible substrate | ~250 |

| 212— | water/oxygen barrier layer | ~220 |
|---|---|---|
| 214— | touch-sensitive device layer | ~210 |
| | circular polarizing layer | ~230 |
| | flexible substrate | ~250 |

TOUCH SENSING FILM STRUCTURE

This application claims the benefit of Taiwan application Serial No. 102102358, filed Jan. 22, 2013, the disclosure of which is incorporated by reference herein in its entirety.

TECHNICAL FIELD

The disclosure relates to a touch sensing film structure used in a flexible display.

BACKGROUND

Flexible display, having the features of lightweight, portability and rollability, is a focus of the next generation products for display panel manufacturers. In the large-scale production flexing test of flexible display, a bending stress applied to the control element is over the limit, the bending stress may cause the flexible display fail.

In the field of consumer electronic products, touch panels have been widely used in portable electronic products. For the users, the flexible touch display device with tortuosity and bendability will be a technology in the manufacturing of flexible electronic products. When the flexible substrate is in a bending state, a film material receives a stress and deteriorates the electrical properties of the sensing elements. In terms of the flexible touch display device, these changes will make touch detection become abnormal and deteriorate the sensitivity of detection. The flexible substrate used in the flexible display has high water/oxygen penetration rate and is susceptible to high temperature processing. Consequently, the flexible substrate cannot avoid water/oxygen penetrating to the flexible substrate, and the lifespan of the flexible display is affected.

SUMMARY

According to one embodiment, a touch sensing film structure comprising a touch-sensitive device layer, a barrier layer and a flexible substrate is provided. The touch-sensitive device layer has a first surface and a second surface opposite to the first surface. The barrier layer is formed on the first surface or the second surface or integrated with the touch-sensitive device layer to form a multi-function layer. The flexible substrate stacks with the barrier layer and the touch-sensitive device layer, or stacks with the multi-function layer.

According to another embodiment, a touch sensing film structure comprising a touch-sensitive device layer, a barrier layer, a circular polarizing layer and a flexible substrate is provided. The touch-sensitive device layer has a first surface and a second surface opposite to the first surface. One of the barrier layer and the circular polarizing layer is formed on the first surface or the second surface or integrated with the touch-sensitive device layer to form a multi-function layer. Or, the circular polarizing layer is integrated with the barrier layer to form a multi-function layer. The flexible substrate stacks with the barrier layer, the touch-sensitive device layer and the circular polarizing layer or stacks with the multi-function layer.

According to an alternative embodiment, a touch sensing film structure including a touch-sensitive device layer, a barrier layer, a color filter layer and a flexible substrate is provided. The touch-sensitive device layer has a first surface and a second surface opposite to the first surface. One of the barrier layer and the color filter layer is formed on the first surface or the second surface or integrated with the touch-sensitive device layer to form a multi-function layer. Or, the barrier layer is integrated with the color filter layer to form a multi-function layer. The flexible substrate stacks with the touch-sensitive device layer, the barrier layer and the color filter layer or stacks with the multi-function layer.

According to another alternative embodiment, a touch sensing film structure comprising a touch-sensitive device layer, a barrier layer, a circular polarizing layer, a color filter layer and a flexible substrate is provided. The touch-sensitive device layer has a first surface and a second surface opposite to the first surface. One of the barrier layer, the circular polarizing layer and the color filter layer is formed on the first surface or the second surface or integrated with the touch-sensitive device layer to form a multi-function layer. Or, two of the barrier layer, the circular polarizing layer and the color filter layer are integrated to form a multi-function layer. The flexible substrate stacks with the touch-sensitive device layer, the barrier layer, the circular polarizing layer and the color filter layer or stacks with the multi-function layer.

According to another alternative embodiment, a touch sensing film structure comprising a touch-sensitive device layer, a barrier layer, a circular polarizing layer, a color filter layer and a flexible substrate is provided. Two of the touch-sensitive device layer, the barrier layer, the circular polarizing layer and the color filter layer are integrated to form a first multi-function layer, and the other two are integrated to form a second multi-function layer, or three or all of the touch-sensitive device layer, the barrier layer, the circular polarizing layer and the color filter layer are integrated to form a multi-function layer. The flexible substrate stacks with the first multi-function layer and the second multi-function layer or stacks with the multi-function layer with three or all functions.

The above and other aspects of the disclosure will become better understood with regard to the following detailed description but non-limiting embodiment(s). The following description is made with reference to the accompanying drawings.

BRIEF DESCRIPTION OF THE DRAWINGS

FIGS. 4A~4D respectively are assembly diagrams of a touch sensing film structure with water/oxygen barrier function.

FIGS. 5A~5F respectively are assembly diagrams of a touch sensing film structure with water/oxygen barrier and circular polarizing functions.

Figure 1:
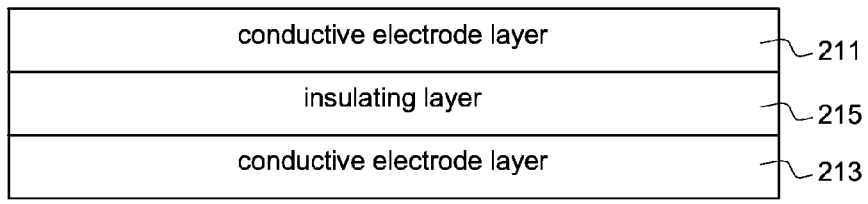
FIG. 1 is a schematic diagram of a touch-sensitive device layer.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A touch sensing film structure used in a flexible display is disclosed in the present disclosure. A layer with water/oxygen barrier function, a layer with circular polarizing function and/or a layer with color filtering function are integrated or stack with a touch-sensitive device layer to reduce the thickness of total layers. For instance, the layers used in the touch-sensitive device layer, the water/oxygen barrier layer or the color filter layer can all be manufactured by using physical vapor deposition, chemical vapor deposition or coating process. Examples of the above layers are such as the transparent conductive electrode layer and the insulating layer used in the touch-sensitive device layer, the organic insulating layer and the inorganic insulating layer used in the water/oxygen barrier layer, the phase delay layer and the polarizing layer used in the circular polarizing layer, or the planarizing layer and the filtering element layer used in the color filter layer. Therefore, in one embodiment all stacked structures of the present embodiment can be completed on one single flexible substrate to form a super-thin multi-function flexible touch film. Besides, the approach of manufacturing a multi-function flexible touch film on the flexible substrate by using existing machines and coating technologies can resolve the problems such as each interface flexibility of layers being too poor and difficult to bend, the overall thickness being too thick and each bonding yield rate of layers being too low.

For example, the touch-sensitive device layer 210 as shown in FIG. 1 comprises two conductive electrode layers 211 and 213 and an insulating layer 215. The conductive electrode layers 211 and 213 can be located between two opposite sides of the insulating layer 215. The conductive electrode layers 211 and 213 may be a single-layered or a dual-layered structure, and are not electrically connected to each other. The insulating layer 215 can be replaced by a layer with water/oxygen barrier function, a layer with circular polarizing function and/or a layer with color filtering function to reduce the overall thickness of the touch sensing film structure and form a multi-function touch-sensitive device layer.

Figure 2:
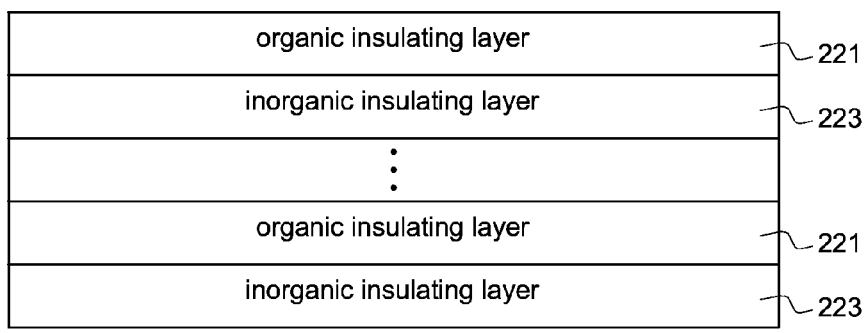
FIG. 2 is a schematic diagram of a water/oxygen barrier layer.

The water/oxygen barrier layer 220 as shown in FIG. 2 comprises at least one organic insulating layer 221 and at least one inorganic insulating layer 223 stacking to each other. The at least one organic insulating layer 221 or the at least one inorganic insulating layer 223 can be replaced by a layer with touch function, a layer with circular polarizing function and/or a layer with color filtering function to reduce the overall thickness of the touch sensing film structure and form a multi-function water/oxygen barrier layer. The water/oxygen barrier layer can be but not limit to a layer with water barrier function, a layer with oxygen barrier function or a layer with both water and oxygen barrier functions.

Figure 3A:
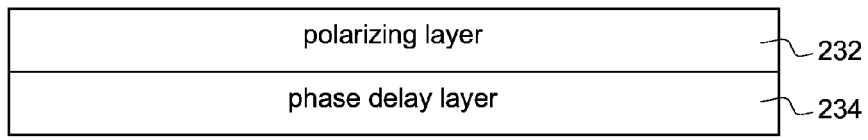
FIG. 3A is a schematic diagram of a circular polarizing layer.

The circular polarizing layer 230 as shown in FIG. 3A comprises a polarizing layer 232 and a phase delay layer 234. A base layer without phase delay property can be interposed between the polarizing layer 232 and the phase delay layer 234. The base layer can be a layer with water/oxygen barrier function, a layer with touch function and/or a layer with color filtering function to form a multi-function circular polarizing layer.

Figure 3B:
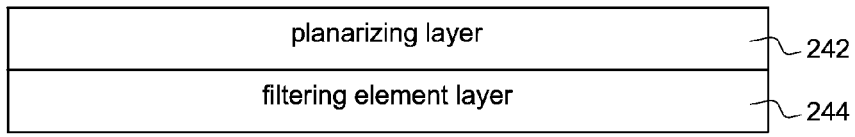
FIG. 3B is a schematic diagram of a color filter layer.

The color filter layer 240 as shown in FIG. 3B comprises a planarizing layer 242 and a filtering element layer 244 composed of several color elements. The planarizing layer 242 can be replaced by a layer with water/oxygen barrier function, a layer with touch function and/or a layer with polarizing function to reduce the overall thickness of the touch sensing film structure and form a multi-function color filter layer.

A number of embodiments are disclosed below for elaborating the disclosure. However, the embodiments of the disclosure are for detailed descriptions only, not for limiting the scope of protection of the discourse. It should be noted that in the accompanying drawings, the thickness of the layer does not reflect actual dimension, and the dimension scale and thickness of the layer can be adjusted according to actual needs, and the discourse is not limited thereto.

First Embodiment

Figure 4A:
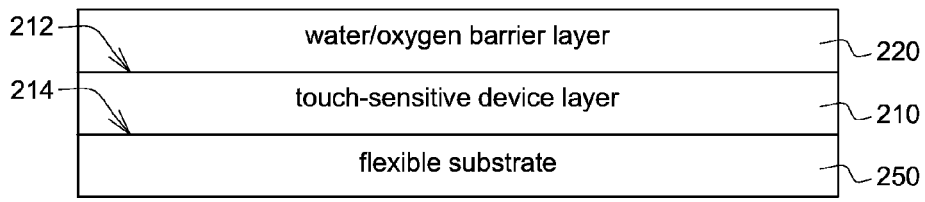
Figure 4B:
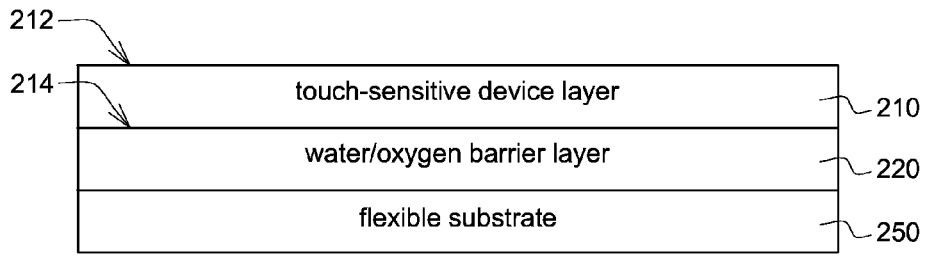

FIGS. 4A~4D respectively are assembly diagrams of a touch sensing film structure 101 with water/oxygen barrier function. As indicated in FIG. 4A, the touch-sensitive device layer 210 has a first surface 212 and a second surface 214, the water/oxygen barrier layer 220 is formed on the first surface 212 of the touch-sensitive device layer 210, and the touch-sensitive device layer 210 is located between the water/oxygen barrier layer 220 and the flexible substrate 250. As indicated in FIG. 4B, the touch-sensitive device layer 210 is formed on the water/oxygen barrier layer 220, and the water/oxygen barrier layer 220 is located between the touch-sensitive device layer 210 and the flexible substrate 250.

As indicated in FIG. 4C, the water/oxygen barrier layer 220 is contained in the touch-sensitive device layer 210 to form a touch-sensitive device layer with barrier function. That is, the insulating layer 215 of the touch-sensitive device layer 210 as shown in FIG. 1 is replaced by the water/oxygen barrier layer 220 to form a multi-function layer (a touch-sensitive device layer containing the water/oxygen barrier layer (210a)).

As indicated in FIG. 4D, the touch-sensitive device layer 210 is contained in the water/oxygen barrier layer 220 to form a water/oxygen barrier layer with touch-sensitive function. That is, at least one organic insulating layer 221 or at least one inorganic insulating layer 223 of the water/oxygen barrier layer 220 as shown in FIG. 2 is replaced by the touch-sensitive device layer 210 to form a multi-function layer (a water/oxygen barrier layer containing the touch-sensitive device layer (220a)).

Second Embodiment

Figure 5B:
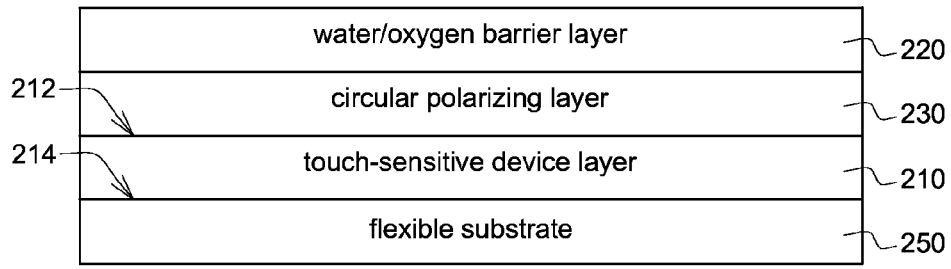

FIGS. 5A~5F respectively are assembly diagrams of a touch sensing film structure 102 with water/oxygen barrier and circular polarizing functions. As indicated in FIG. 5A, the touch-sensitive device layer 210 has a first surface 212 and a second surface 214, the water/oxygen barrier layer 220 is formed on the first surface 212 of the touch-sensitive device layer 210, the circular polarizing layer 230 is located between the touch-sensitive device layer 210 and the flexible substrate 250. As indicated in FIG. 5B, the circular polarizing layer 230 is located between the water/oxygen barrier layer 220 and the first surface 212 of the touch-sensitive device layer 210, the water/oxygen barrier layer 220 is formed on the circular polarizing layer 230, and the touch-sensitive device layer 210 is located between the circular polarizing layer 230 and the flexible substrate 250.

Figure 5C:
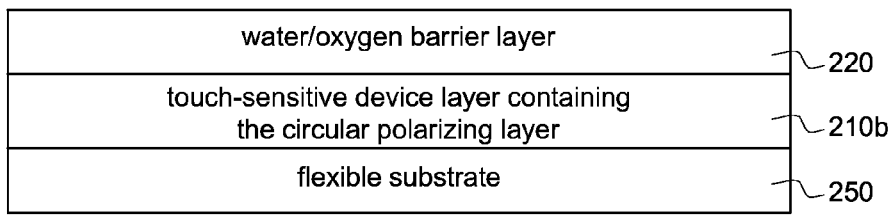

As indicated in FIG. 5C, the circular polarizing layer 230 is contained in the touch-sensitive device layer 210 to form a touch-sensitive device layer containing the circular polarizing layer (210b). That is, the insulating layer 215 of the touch-sensitive device layer 210 as shown in FIG. 1 is replaced by the circular polarizing layer 230 to form a multi-function layer (a touch-sensitive device layer containing the circular polarizing layer (210b)).

Figure 5D:
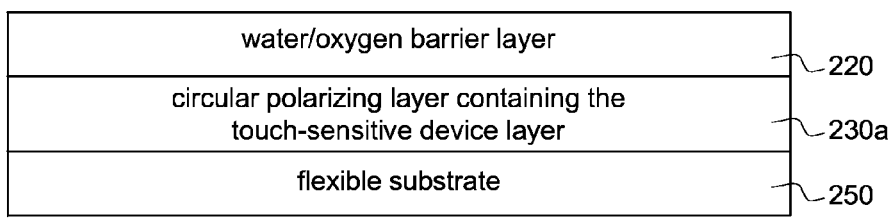

As indicated in FIG. 5D, the touch-sensitive device layer 210 is contained in the circular polarizing layer 230 to form a circular polarizing layer containing the touch-sensitive device layer (230a). That is, a touch-sensitive device layer 210 is interposed between the polarizing layer 232 and the phase delay layer 234 as shown in FIG. 3A to form a multi-function layer (a circular polarizing layer containing the touch-sensitive device layer (230a)).

Figure 5E:
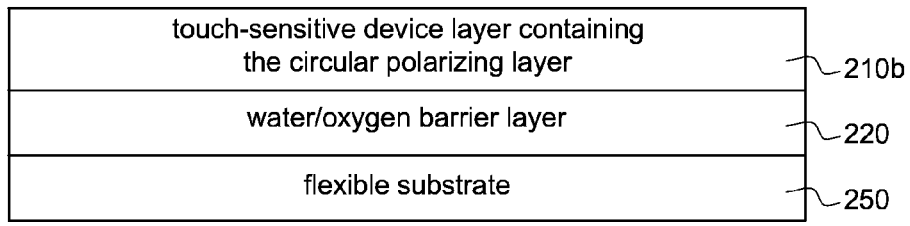
Figure 5F:
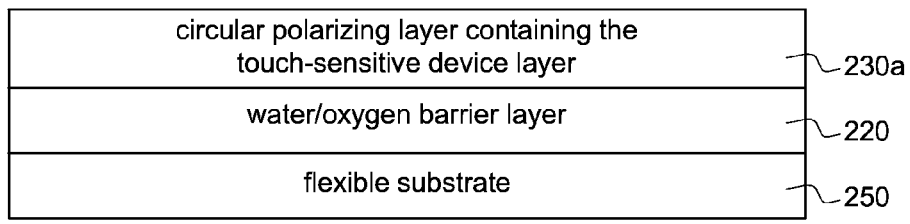

FIG. 5C is different from FIG. 5E in that the multi-function layer (the touch-sensitive device layer containing the circular polarizing layer (210b)) can be located on opposite side of the water/oxygen barrier layer 220. FIG. 5D is different from FIG. 5F in that the multi-function layer (the circular polarizing layer containing the touch-sensitive device layer (230a)) can be located on opposite side of the water/oxygen barrier layer 220.

Third Embodiment

Figure 6A:
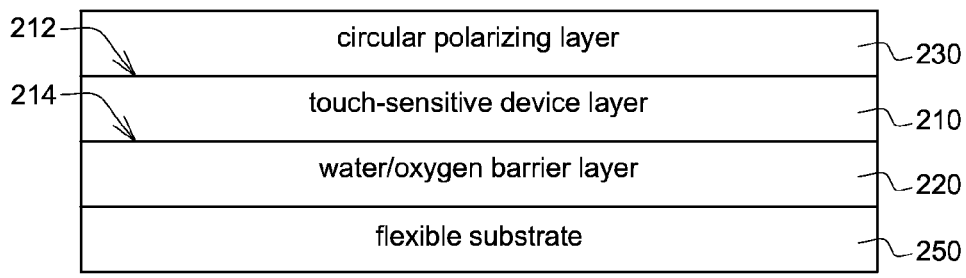
FIGS. 6A~6F respectively are assembly diagrams of a touch sensing film structure with water/oxygen barrier and circular polarizing functions.
Figure 6B:
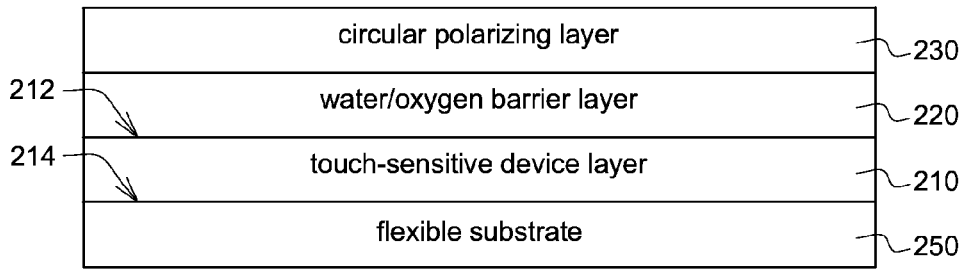

FIGS. 6A~6F respectively are assembly diagrams of a touch sensing film structure 103 with water/oxygen barrier and circular polarizing functions. As indicated in FIG. 6A, the touch-sensitive device layer 210 has a first surface 212 and a second surface 214, the circular polarizing layer 230 is formed on the first surface 212 of the touch-sensitive device layer 210, and the water/oxygen barrier layer 220 is located between the touch-sensitive device layer 210 and the flexible substrate 250. As indicated in FIG. 6B, the water/oxygen barrier layer 220 is located between the circular polarizing layer 230 and the first surface 212 of the touch-sensitive device layer 210, the circular polarizing layer 230 is formed on the water/oxygen barrier layer 220, and the touch-sensitive device layer 210 is located between the water/oxygen barrier layer 220 and the flexible substrate 250.

Figure 6C:
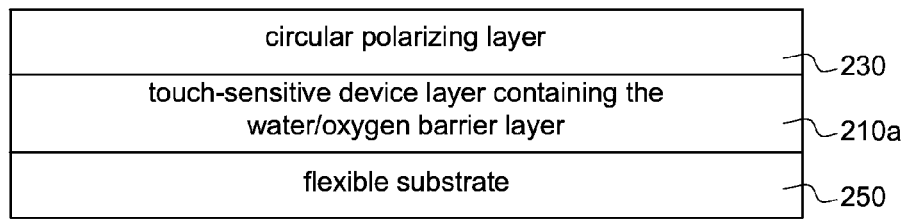

As indicated in FIG. 6C, the water/oxygen barrier layer 220 is contained in the touch-sensitive device layer 210 to form a touch-sensitive device layer containing the water/oxygen barrier layer (210a). That is, the insulating layer 215 of the touch-sensitive device layer 210 as shown in FIG. 1 is replaced by the water/oxygen barrier layer 220 to form a multi-function layer (a touch-sensitive device layer 210a containing the water/oxygen barrier layer (210a)).

Figure 6D:
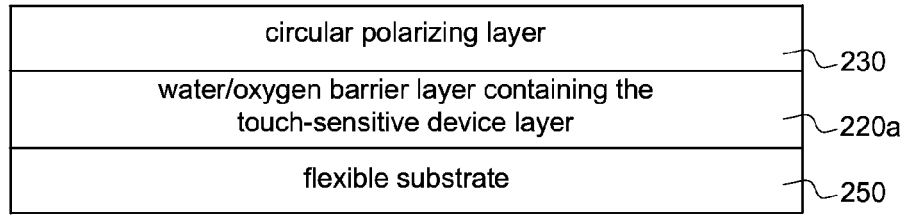

As indicated in FIG. 6D, the touch-sensitive device layer 210 is contained in the water/oxygen barrier layer 220 to form a water/oxygen barrier layer containing the touch-sensitive device layer (220a). That is, at least one organic insulating layer 221 or at least one inorganic insulating layer 223 of the water/oxygen barrier layer 220 as shown in FIG. 2 is replaced by the touch-sensitive device layer 210 to form a multi-function layer (a water/oxygen barrier layer containing the touch-sensitive device layer (220a)).

Figure 6E:
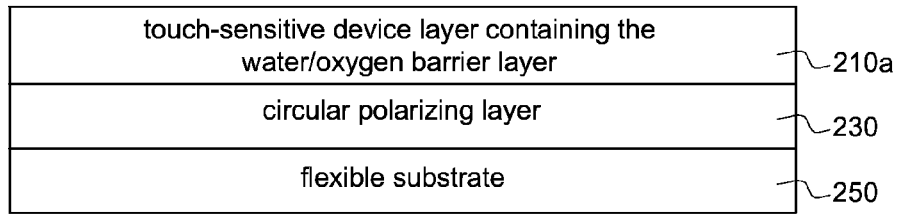
Figure 6F:
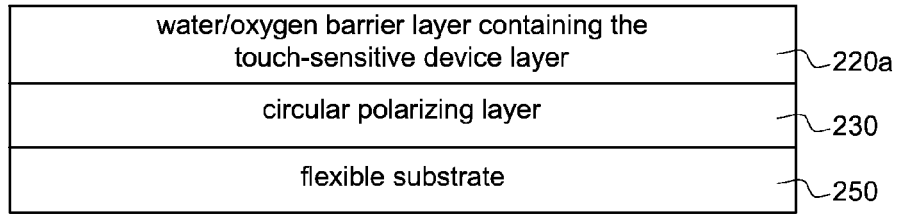

FIG. 6C is different from FIG. 6E in that the multi-function layer (the touch-sensitive device layer containing the water/oxygen barrier layer (210a)) can be located on opposite side of the circular polarizing layer 230. FIG. 6D is different from FIG. 6F in that the multi-function layer (the water/oxygen barrier layer containing the touch-sensitive device layer (220a)) can be located on opposite side of the circular polarizing layer 230.

Fourth Embodiment

Figure 7A:
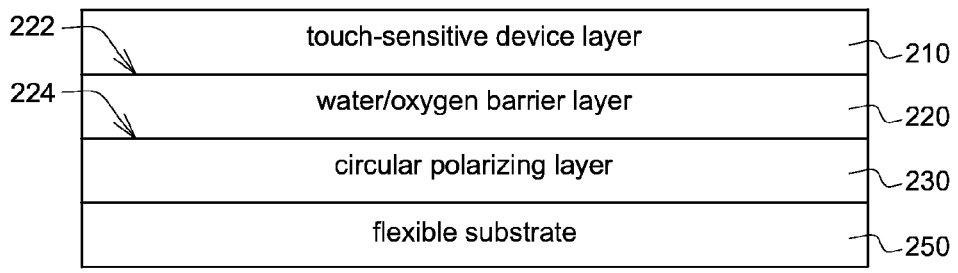
FIGS. 7A~7F respectively are assembly diagrams of a touch sensing film structure with water/oxygen barrier and circular polarizing functions.
Figure 7B:
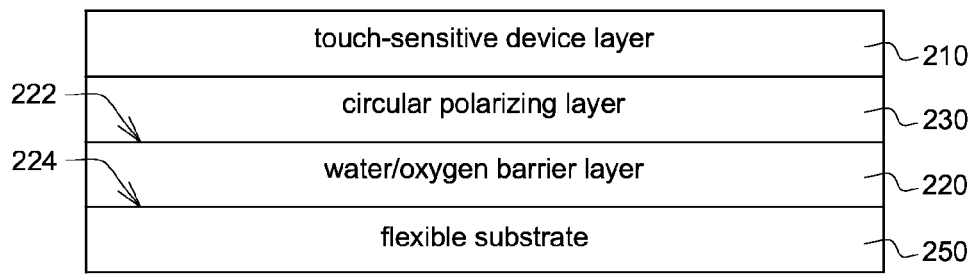

FIGS. 7A~7F respectively are assembly diagrams of a touch sensing film structure 104 with water/oxygen barrier and circular polarizing functions. As indicated in FIG. 7A, the water/oxygen barrier layer 220 has a first surface 222 and a second surface 224, the touch-sensitive device layer 210 is formed on the first surface 222 of the water/oxygen barrier layer 220, the circular polarizing layer 230 is located between the water/oxygen barrier layer 220 and the flexible substrate 250. As indicated in FIG. 7B, the circular polarizing layer 230 is located between the touch-sensitive device layer 210 and the first surface 222 of the water/oxygen barrier layer 220, the touch-sensitive device layer 210 is formed on the circular polarizing layer 230, and the water/oxygen barrier layer 220 is located between the circular polarizing layer 230 and the flexible substrate 250.

Figure 7C:
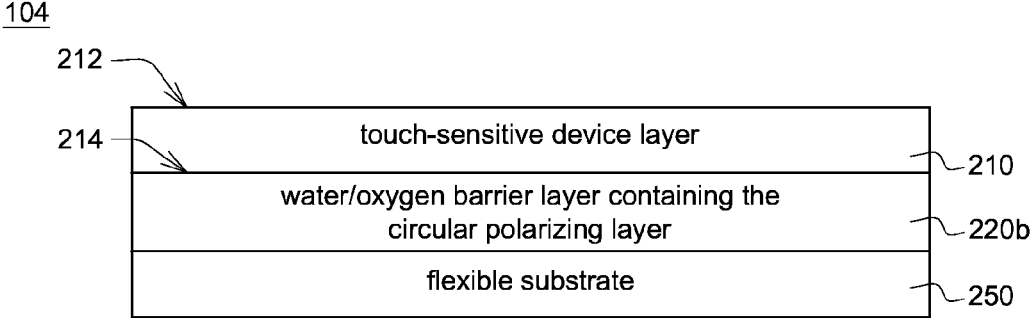

As indicated in FIG. 7C, the circular polarizing layer 230 is contained in the water/oxygen barrier layer 220 to form a water/oxygen barrier layer containing the circular polarizing layer (220b). That is, at least one organic insulating layer 221 or at least one inorganic insulating layer 223 of the water/oxygen barrier layer 220 as shown in FIG. 2 is replaced by the circular polarizing layer 230 to form a multi-function layer (a water/oxygen barrier layer containing the circular polarizing layer (220b)).

Figure 7D:
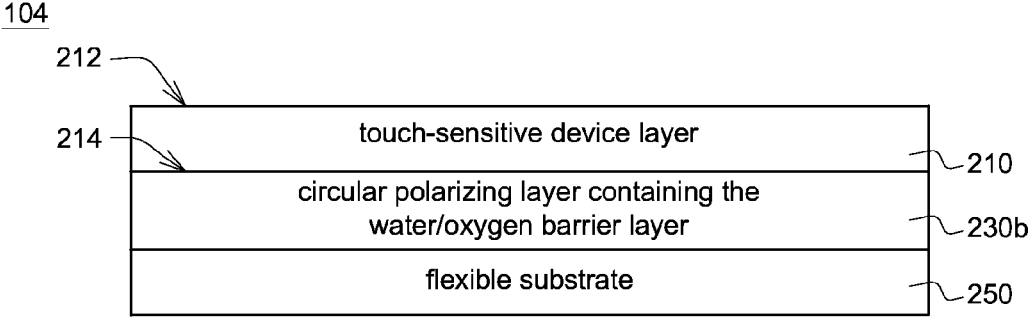

As indicated in FIG. 7D, the water/oxygen barrier layer 220 is contained in the circular polarizing layer 230 to form a circular polarizing layer containing the water/oxygen barrier layer (230b). That is, a water/oxygen barrier layer 220 is interposed between the polarizing layer 232 and the phase delay layer 234 as shown in FIG. 3A to form a multi-function layer (a circular polarizing layer containing the water/oxygen barrier layer (230b)).

Figure 7E:
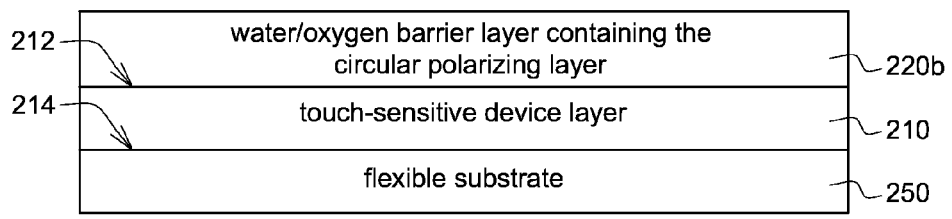
Figure 7F:
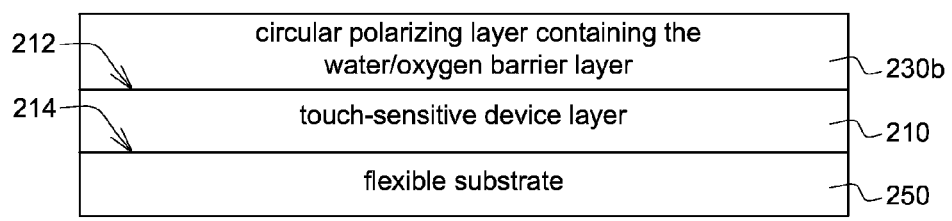

FIG. 7C is different from FIG. 7E in that the multi-function layer (the water/oxygen barrier layer containing the circular polarizing layer (220b)) can be located on opposite side of the touch-sensitive device layer 210. FIG. 7D is different from FIG. 7F in that the multi-function layer (the circular polarizing layer containing the water/oxygen barrier layer (230b)) can be located on opposite side of the touch-sensitive device layer 210.

Fifth Embodiment

Figure 8A:
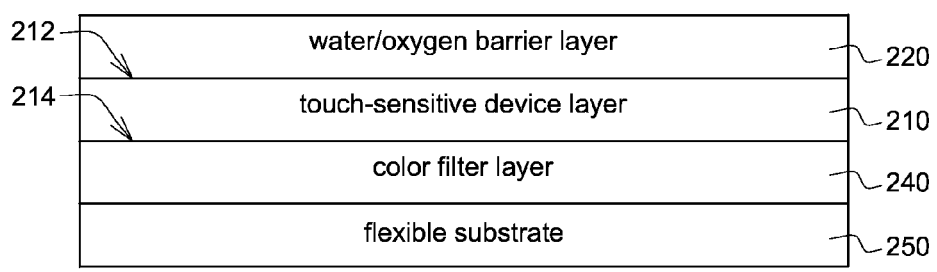
FIGS. 8A~8F respectively are assembly diagrams of a touch sensing film structure with water/oxygen barrier and color filtering functions.
Figure 8B:
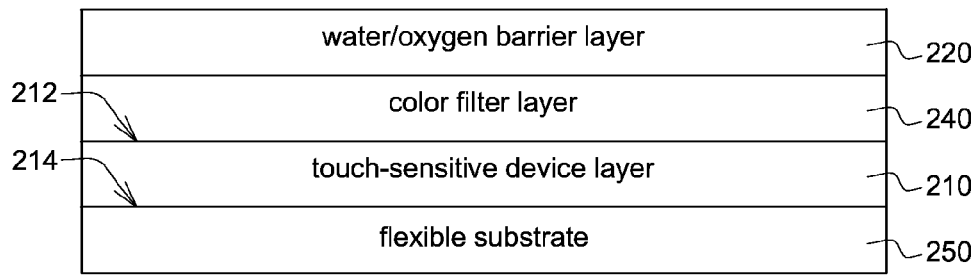

FIGS. 8A~8F respectively are assembly diagrams of a touch sensing film structure 105 with water/oxygen barrier and color filtering functions. As indicated in FIG. 8A, the touch-sensitive device layer 210 has a first surface 212 and a second surface 214, the water/oxygen barrier layer 220 is formed on the first surface 212 of the touch-sensitive device layer 210, the color filter layer 240 is located between the touch-sensitive device layer 210 and the flexible substrate 250. As indicated in FIG. 8B, the color filter layer 240 is located between the water/oxygen barrier layer 220 and the first surface 212 of the touch-sensitive device layer 210, the water/oxygen barrier layer 220 is formed on the color filter layer 240, and the touch-sensitive device layer 210 is located between the color filter layer 240 and the flexible substrate 250.

Figure 8C:
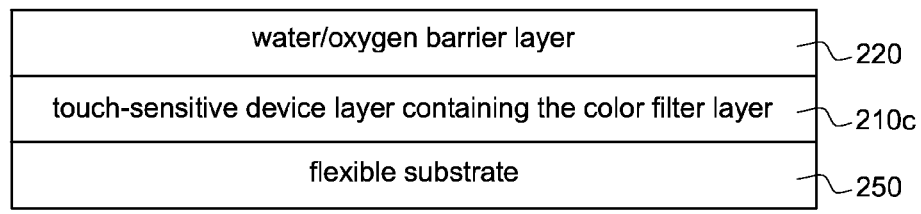

As indicated in FIG. 8C, the color filter layer 240 is contained in the touch-sensitive device layer 210 to form a touch-sensitive device layer containing the color filter layer (210c). That is, the insulating layer 215 of the touch-sensitive device layer 210 as shown in FIG. 1 is replaced by the color filter layer 240 to form a multi-function layer (a touch-sensitive device layer containing the color filter layer (210c)).

Figure 8D:
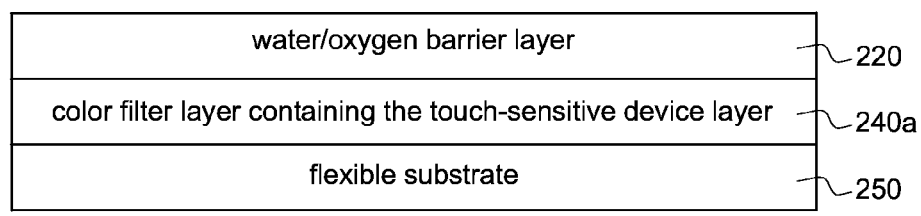

As indicated in FIG. 8D, the touch-sensitive device layer 210 is contained in the color filter layer 240 to form a color filter layer containing the touch-sensitive device layer (240a). That is, the planarizing layer 242 of the color filter layer 240 as shown in FIG. 3B is replaced by the touch-sensitive device layer 210 to form a multi-function layer (a color filter layer containing the touch-sensitive device layer (240a)).

Figure 8E:
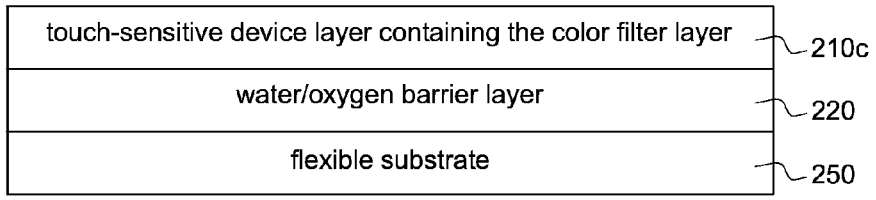
Figure 8F:
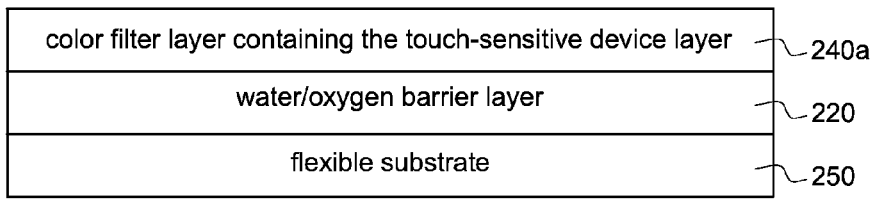

FIG. 8C is different from FIG. 8E in that the multi-function layer (the touch-sensitive device layer containing the color filter layer (210c)) can be located on opposite side of the water/oxygen barrier layer 220. FIG. 8D is different from FIG. 8F in that the multi-function layer (the color filter layer containing the touch-sensitive device layer (240a)) can be located on opposite side of the water/oxygen barrier layer 220.

Sixth Embodiment

Figure 9A:
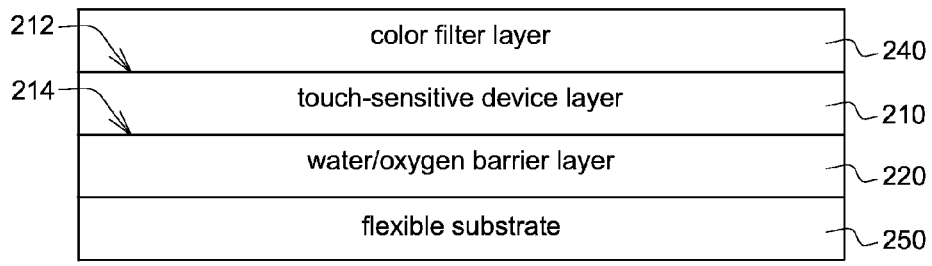
FIG. 9A~9F respectively are assembly diagrams of a touch sensing film structure with water/oxygen barrier and color filtering functions.
Figure 9B:
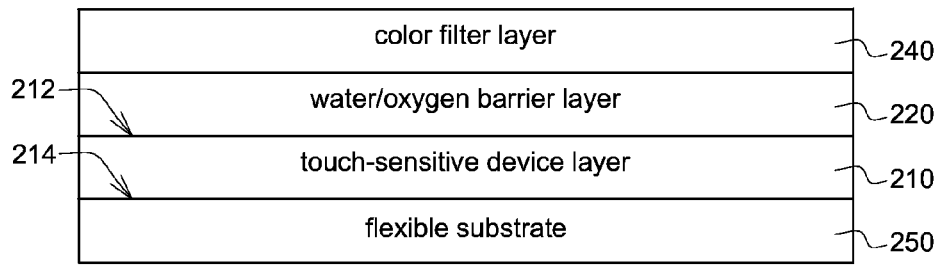

FIGS. 9A~9F respectively are assembly diagrams of a touch sensing film structure 106 with water/oxygen barrier and color filtering functions. As indicated in FIG. 9A, the touch-sensitive device layer 210 has a first surface 212 and a second surface 214, the color filter layer 240 is formed on the first surface 212 of the touch-sensitive device layer 210, the water/oxygen barrier layer 220 is located between the touch-sensitive device layer 210 and the flexible substrate 250. As indicated in FIG. 9B, the water/oxygen barrier layer 220 is located between the color filter layer 240 and the first surface 212 of the touch-sensitive device layer 210, the color filter layer 240 is formed on the water/oxygen barrier layer 220, and the touch-sensitive device layer 210 is located between the water/oxygen barrier layer 220 and the flexible substrate 250.

Figure 9C:
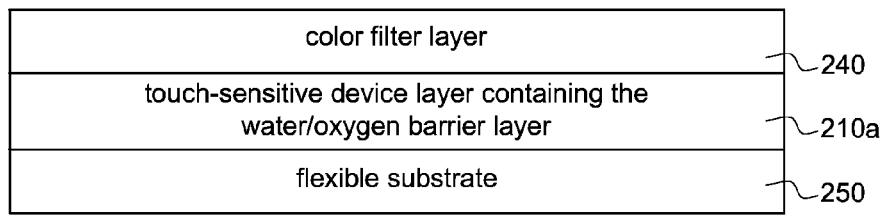

As indicated in FIG. 9C, the water/oxygen barrier layer 220 is contained in the touch-sensitive device layer 210 to form a touch-sensitive device layer containing the water/oxygen barrier layer (210a). That is, the insulating layer 215 of the touch-sensitive device layer 210 as shown in FIG. 1 is replaced by the water/oxygen barrier layer 220 to form a multi-function layer (a touch-sensitive device layer containing the water/oxygen barrier layer (210a)).

Figure 9D:
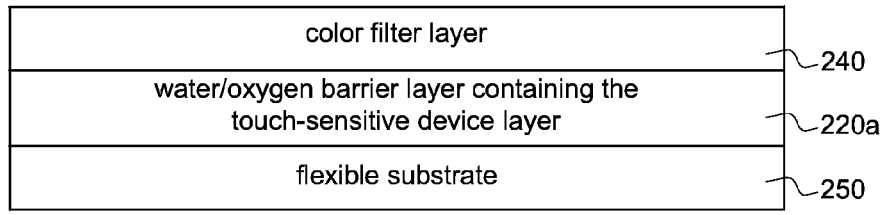

As indicated in FIG. 9D, the touch-sensitive device layer 210 is contained in the water/oxygen barrier layer 220 to form a water/oxygen barrier layer containing the touch-sensitive device layer (220a). That is, at least one organic insulating layer 221 or at least one inorganic insulating layer 223 of the water/oxygen barrier layer 220 as shown in FIG. 2 is replaced by the touch-sensitive device layer 210 to form a multi-function layer (a water/oxygen barrier layer containing the touch-sensitive device layer (220a)).

Figure 9E:
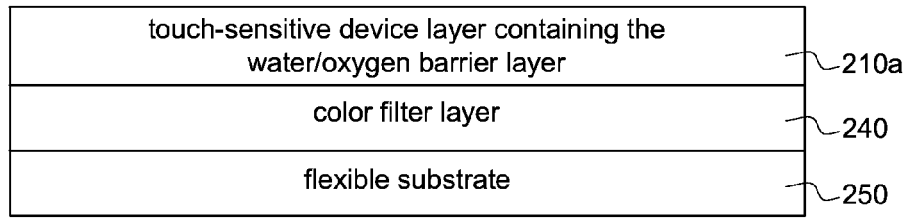
Figure 9F:
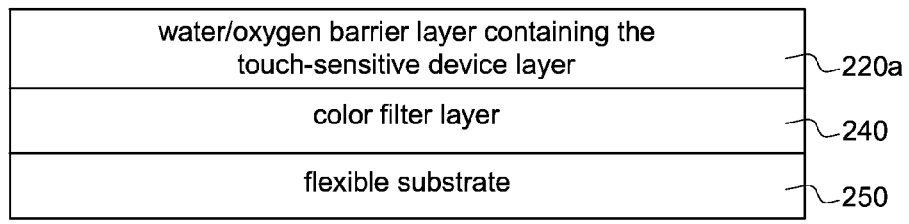

FIG. 9C is different from FIG. 9E in that the multi-function layer (the touch-sensitive device layer containing the water/oxygen barrier layer (210a)) can be located on opposite side of the color filter layer 240. FIG. 9D is different from FIG. 9F in that the multi-function layer (the water/oxygen barrier layer containing the touch-sensitive device layer (220a)) can be located on opposite side of the color filter layer 240.

Seventh Embodiment

Figure 10A:
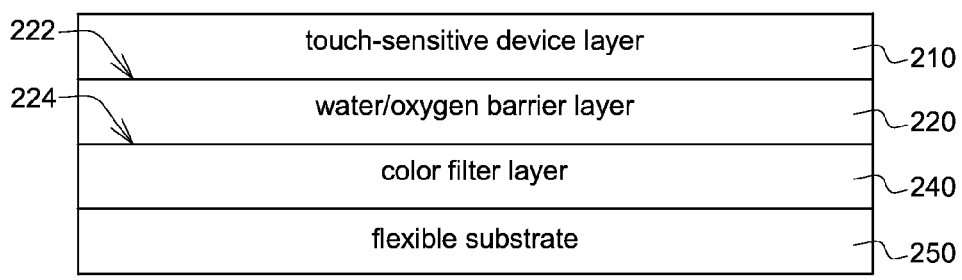
FIGS. 10A~10F respectively are assembly diagrams of a touch sensing film structure with water/oxygen barrier and color filtering functions.
Figure 10B:
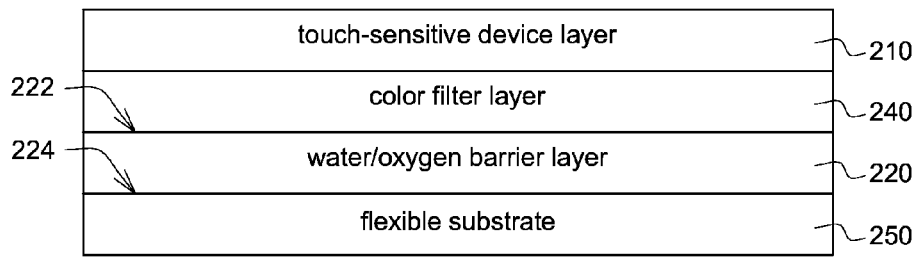
Figure 10C:
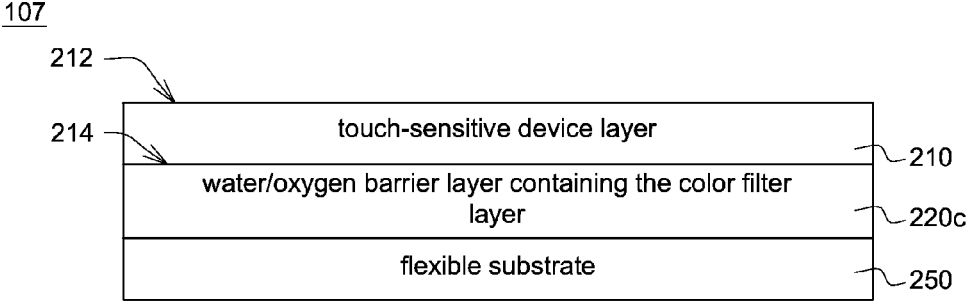

FIGS. 10A~10F respectively are assembly diagrams of a touch sensing film structure 107 with water/oxygen barrier and color filtering functions. As indicated in FIG. 10A, the water/oxygen barrier layer 220 has a first surface 222 and a second surface 224, the touch-sensitive device layer 210 is formed on the first surface 222 of the water/oxygen barrier layer 220, the color filter layer 240 is located between the water/oxygen barrier layer 220 and the flexible substrate 250. As indicated in FIG. 10B, the color filter layer 240 is located between the touch-sensitive device layer 210 and the first surface 222 of the water/oxygen barrier layer 220, the touch-sensitive device layer 210 is formed on the color filter layer 240, and the water/oxygen barrier layer 220 is located between the color filter layer 240 and the flexible substrate 250.

As indicated in FIG. 10O, the color filter layer 240 is contained in the water/oxygen barrier layer 220 to form a water/oxygen barrier layer containing the color filter layer (220c). That is, at least one organic insulating layer 221 or at least one inorganic insulating layer 223 of the water/oxygen barrier layer 220 as shown in FIG. 2 is replaced by the color filter layer 240 to form a multi-function layer (a water/oxygen barrier layer containing the color filter layer (220c)).

Figure 10D:
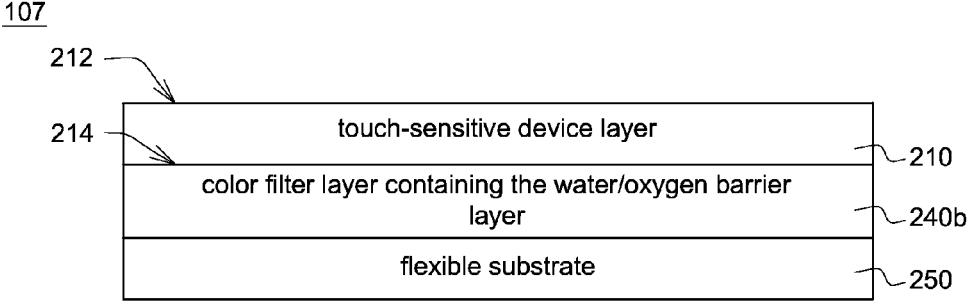

As indicated in FIG. 10D, the water/oxygen barrier layer 220 is contained in the color filter layer 240 to form a color filter layer containing the water/oxygen barrier layer (240b). That is, the planarizing layer 242 as shown in FIG. 3B is replaced by the water/oxygen barrier layer 220 to form a multi-function layer (a color filter layer containing the water/oxygen barrier layer (240*b*)).

Figure 10E:
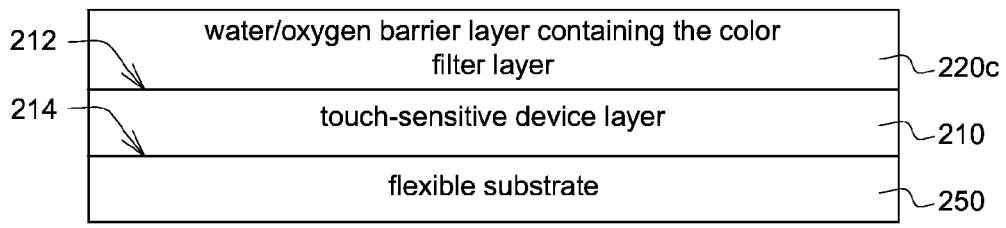
Figure 10F:
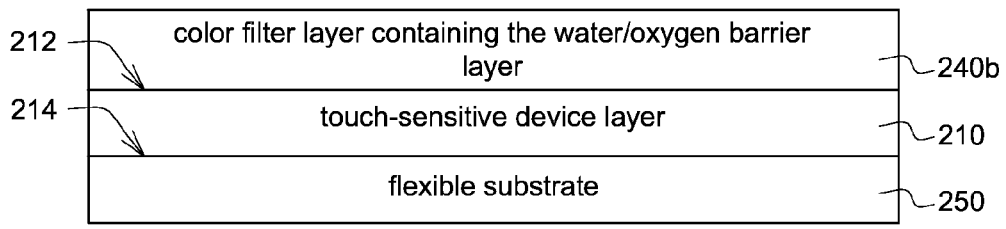

FIG. 10O is different from FIG. 10E in that the multi-function layer (the water/oxygen barrier layer containing the color filter layer (220*c*)) can be located on opposite side of the touch-sensitive device layer 210. FIG. 10D is different from FIG. 10F in that the multi-function layer (the color filter layer containing the water/oxygen barrier layer (240*b*)) can be located on opposite side of the touch-sensitive device layer 210.

Eighth Embodiment

Figure 11A:
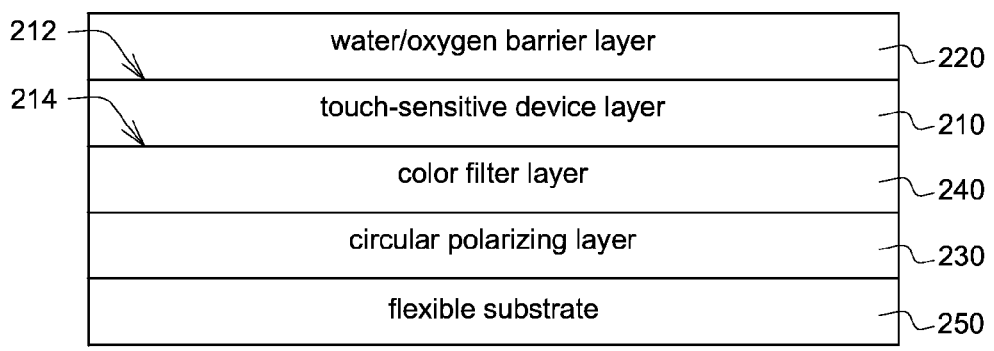
FIGS. 11A~11F respectively are assembly diagrams of a touch sensing film structure with water/oxygen barrier, circular polarizing and color filtering functions.
Figure 11B:
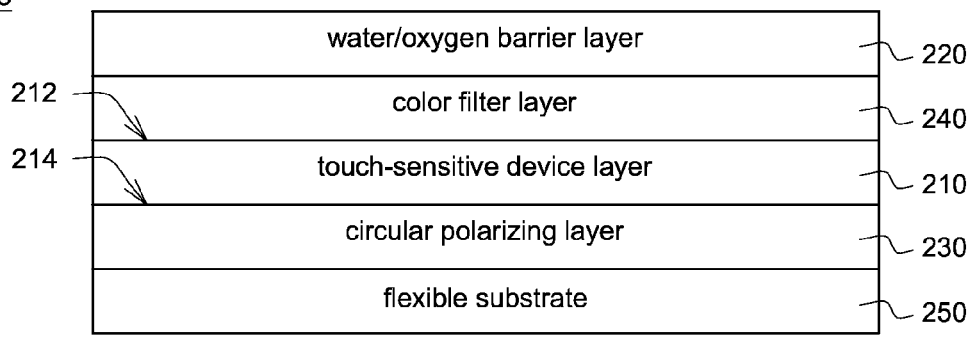
Figure 11C:
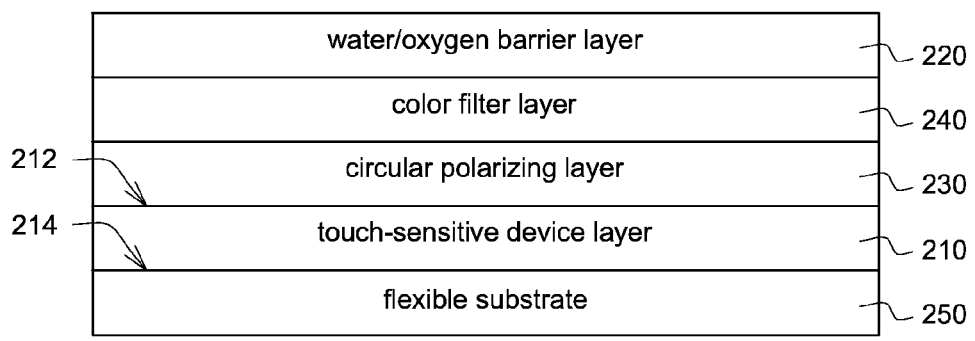
Figure 11D:
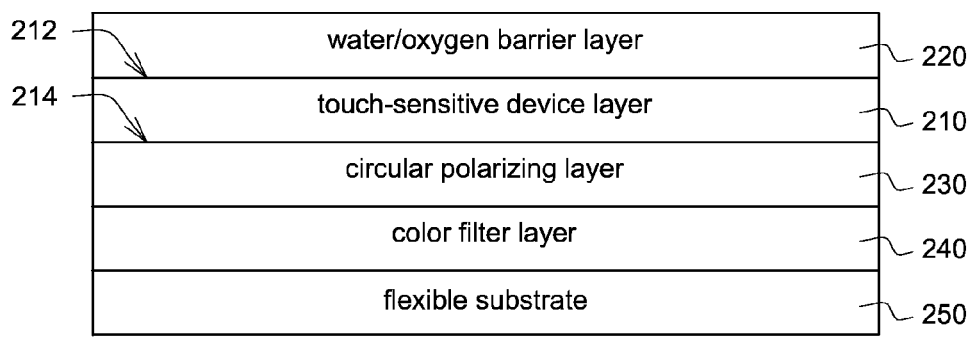

FIGS. 11A~11F respectively are assembly diagrams of a touch sensing film structure 108 with water/oxygen barrier, circular polarizing and color filtering functions. As indicated in FIG. 11A, the touch-sensitive device layer 210 has a first surface 212 and a second surface 214, the water/oxygen barrier layer 220 is formed on the first surface 212 of the touch-sensitive device layer 210, the color filter layer 240 is located between the touch-sensitive device layer 210 and the circular polarizing layer 230, and the circular polarizing layer 230 is located between the color filter layer 240 and the flexible substrate 250. Or, as indicated in FIG. 11D, the circular polarizing layer 230 is located between the touch-sensitive device layer 210 and the color filter layer 240, and the color filter layer 240 is located between the circular polarizing layer 230 and the flexible substrate 250.

Figure 11E:
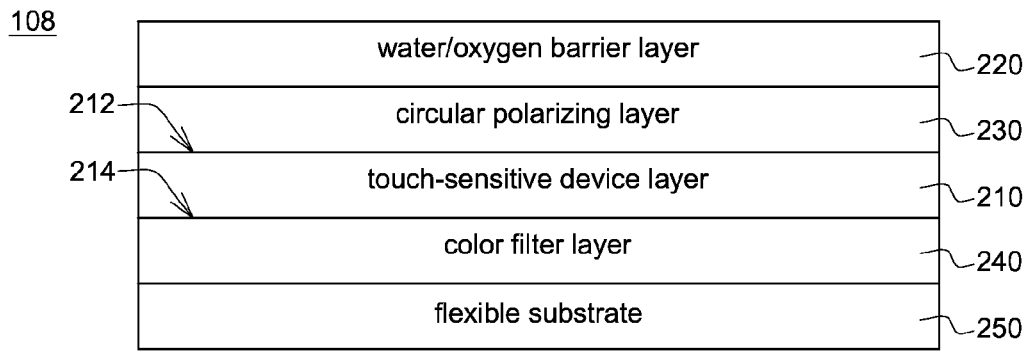

As indicated in FIG. 11B, the water/oxygen barrier layer 220 is formed on the color filter layer 240, the touch-sensitive device layer 210 is located between the color filter layer 240 and the circular polarizing layer 230, the circular polarizing layer 230 is located between the touch-sensitive device layer 210 and the flexible substrate 250. Or, as indicated in FIG. 11E, the circular polarizing layer 230 is located between the water/oxygen barrier layer 220 and the first surface 212 of the touch-sensitive device layer 210, the color filter layer 240 is located between the touch-sensitive device layer 210 and the flexible substrate 250.

Figure 11F:
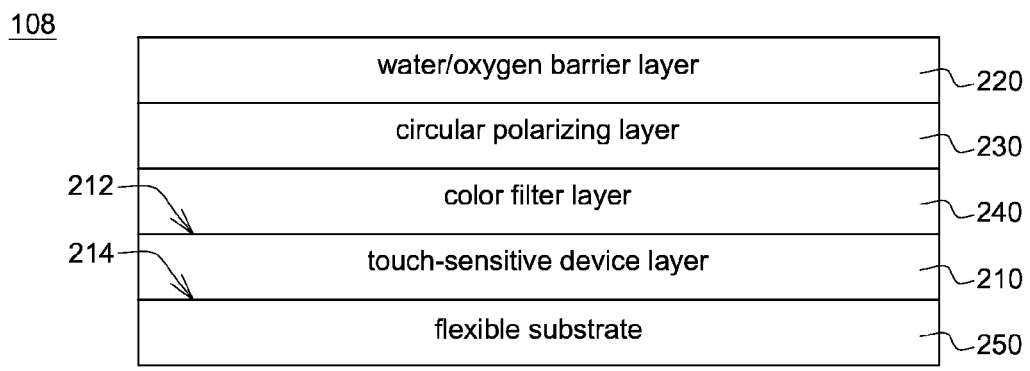

As indicated in FIG. 11C, the color filter layer 240 is located between the water/oxygen barrier layer 220 and the circular polarizing layer 230, the circular polarizing layer 230 is located between the color filter layer 240 and the first surface 212 of the touch-sensitive device layer 210, and the touch-sensitive device layer 210 is located between the circular polarizing layer 230 and the flexible substrate 250. Or, as indicated in FIG. 11F, the color filter layer 240 is located between the circular polarizing layer 230 and the first surface 212 of the touch-sensitive device layer 210, and the touch-sensitive device layer 210 is located between the color filter layer 240 and the flexible substrate 250.

Ninth Embodiment

Figure 12A:
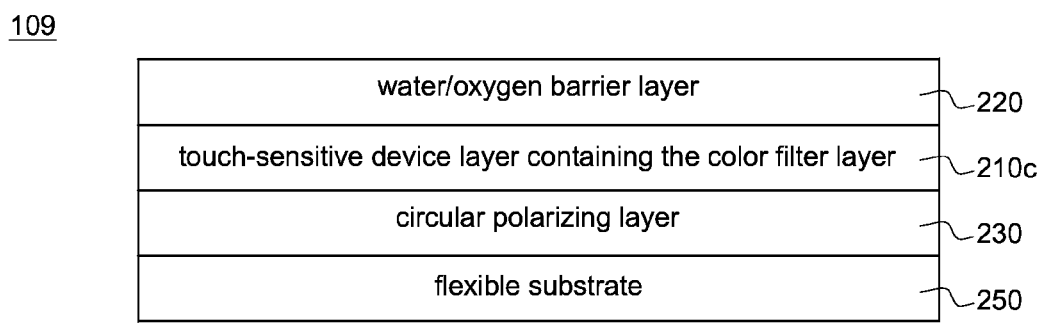
FIGS. 12A~12F respectively are assembly diagrams of a touch sensing film structure with water/oxygen barrier, circular polarizing and color filtering functions.
Figure 12B:
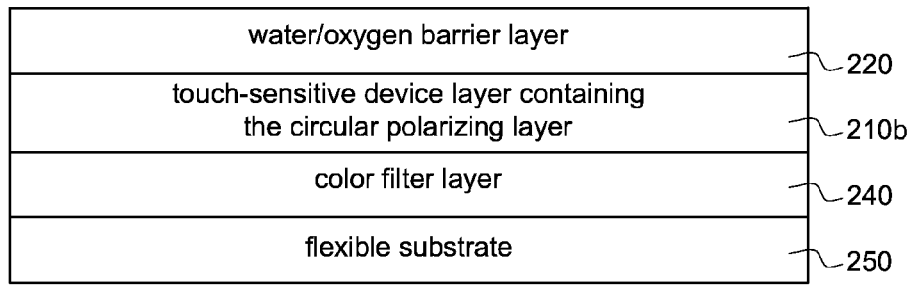
Figure 12C:
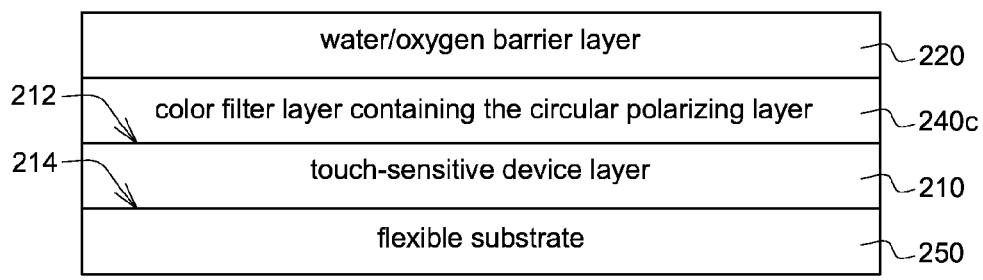
Figure 12D:
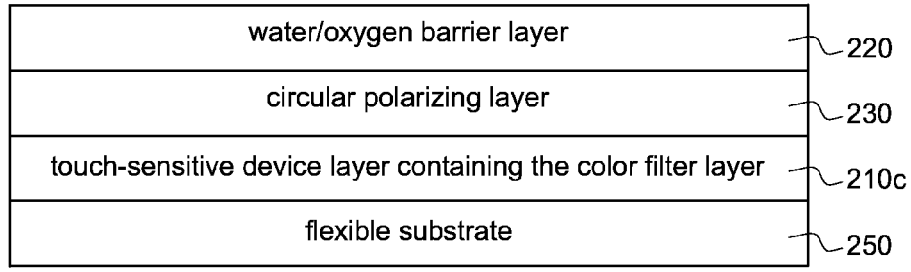

FIGS. 12A~12F respectively are assembly diagrams of a touch sensing film structure 109 with water/oxygen barrier, circular polarizing and color filtering functions. As indicated in FIG. 12A, the color filter layer 240 can be contained in the touch-sensitive device layer 210 to form a touch-sensitive device layer 210*c* containing the color filter layer 240, that is, a multi-function layer located between the water/oxygen barrier layer 220 and the circular polarizing layer 230. Or, as indicated in FIG. 12D, the multi-function layer (the touch-sensitive device layer 210*c* containing the color filter layer) is located between the circular polarizing layer 230 and the flexible substrate 250.

Figure 12E:
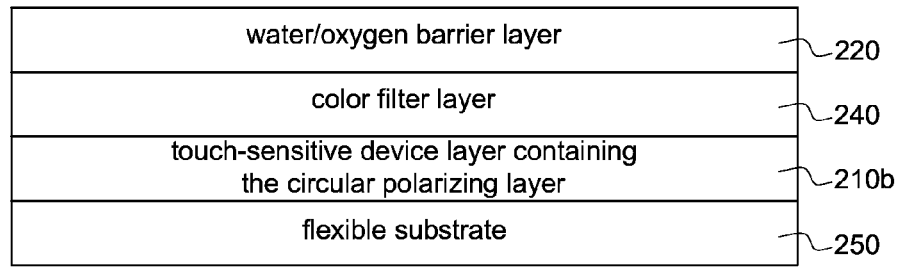

As indicated in FIG. 12B, the circular polarizing layer 230 can be contained in the touch-sensitive device layer 210 to form a touch-sensitive device layer containing the circular polarizing layer (210*b*), that is, a multi-function layer located between the water/oxygen barrier layer 220 and the color filter layer 240. Or, as indicated in FIG. 12E, the multi-function layer (the touch-sensitive device layer containing the circular polarizing layer (210*b*)) is located between the color filter layer 240 and the flexible substrate 250.

Figure 12F:
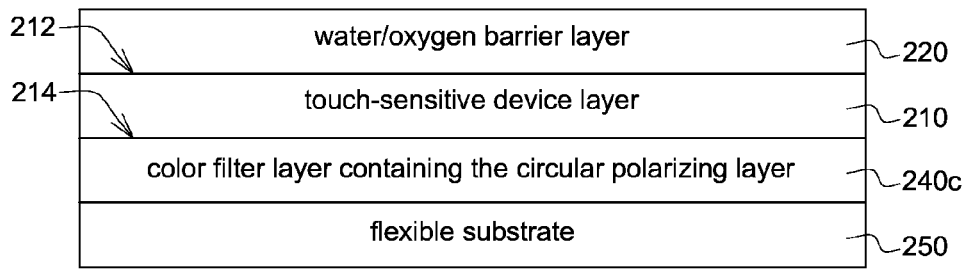

As indicated in FIG. 12C, the circular polarizing layer 230 can be contained in the color filter layer 240 to form a color filter layer containing the circular polarizing layer 230, that is, a multi-function layer located between the water/oxygen barrier layer 220 and the touch-sensitive device layer 210. Or, as indicated in FIG. 12F, the multi-function layer (the color filter layer containing the circular polarizing layer (240*c*)) is located between the touch-sensitive device layer 210 and the flexible substrate 250.

Tenth Embodiment

Figure 13A:
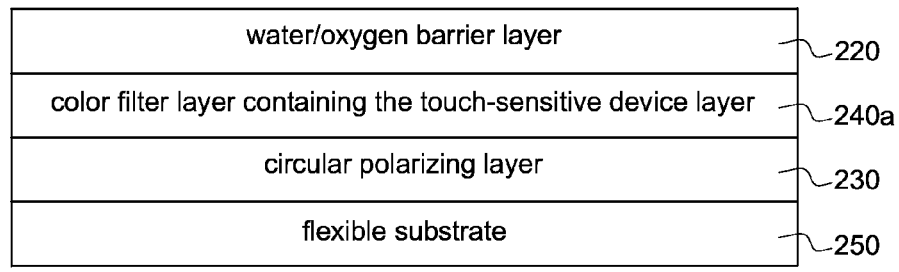
FIGS. 13A~13F respectively are assembly diagrams of a touch sensing film structure with water/oxygen barrier, circular polarizing and color filtering functions.
Figure 13B:
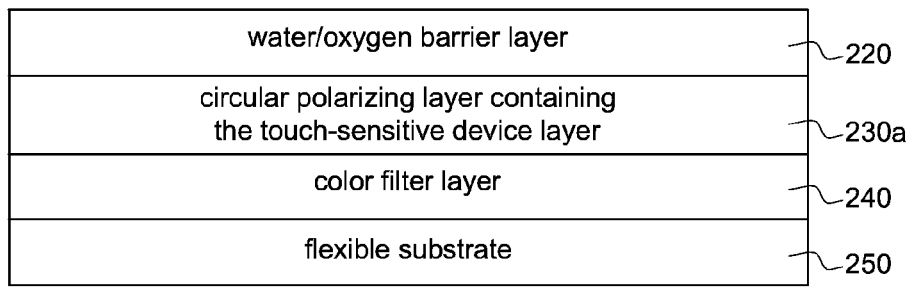
Figure 13C:
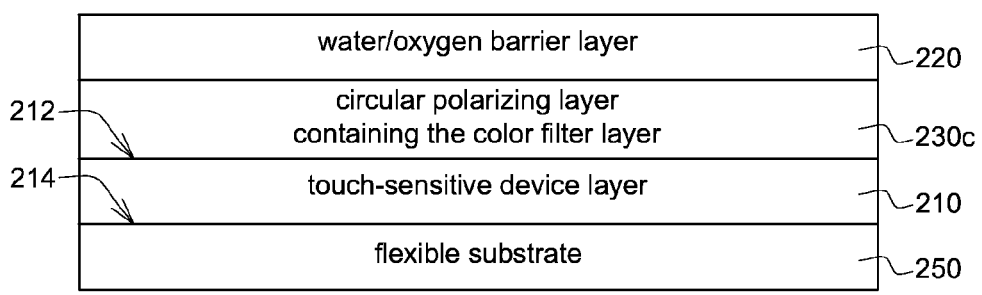
Figure 13D:
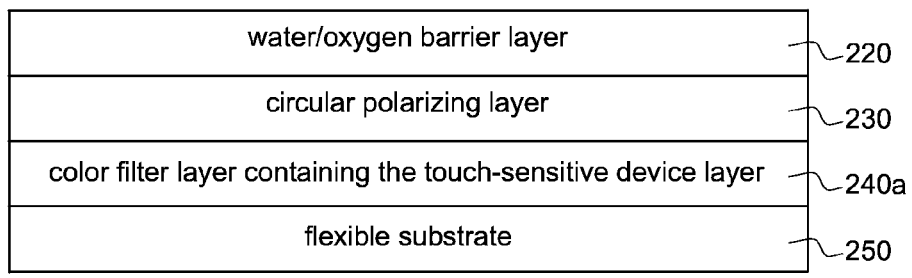

FIGS. 13A~13F respectively are assembly diagrams of a touch sensing film structure 110 with water/oxygen barrier, circular polarizing and color filtering functions. As indicated in FIG. 13A, the touch-sensitive device layer 210 can be contained in the color filter layer 240 to form a color filter layer containing the touch-sensitive device layer (240*a*), that is, a multi-function layer is located between the water/oxygen barrier layer 220 and the circular polarizing layer 230. Or, as indicated in FIG. 13D, the multi-function layer (the color filter layer containing the touch-sensitive device layer (240*a*)) is located between the circular polarizing layer 230 and the flexible substrate 250.

Figure 13E:
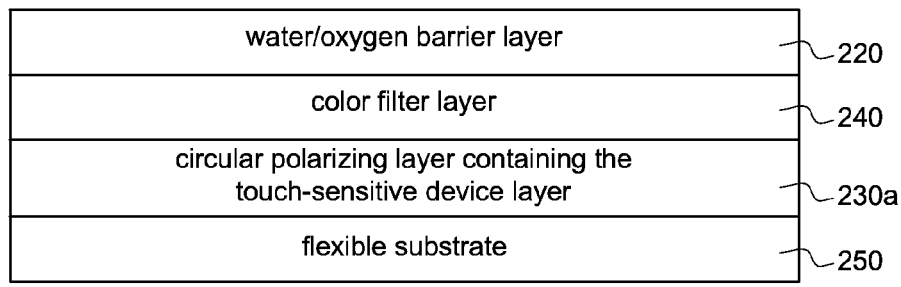

As indicated in FIG. 13B, the touch-sensitive device layer 210 can be contained in the circular polarizing layer 230 to form a circular polarizing layer containing the touch-sensitive device layer (230*a*), that is, a multi-function layer is located between the water/oxygen barrier layer 220 and the color filter layer 240. Or, as indicated in FIG. 13E, the multi-function layer (the circular polarizing layer containing the touch-sensitive device layer (230*a*)) is located between the color filter layer 240 and the flexible substrate 250.

Figure 13F:
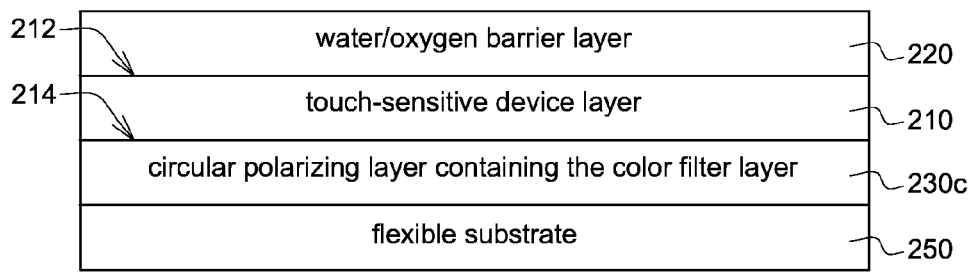

As indicated in FIG. 13C, the color filter layer 240 can be contained in the circular polarizing layer 230 to form a circular polarizing layer containing the color filter layer (230*c*), that is, a multi-function layer is located between the water/oxygen barrier layer 220 and the touch-sensitive device layer 210. Or, as indicated in FIG. 13F, the multi-function layer (the circular polarizing layer containing the color filter layer (230*c*)) is located between the touch-sensitive device layer 210 and the flexible substrate 250.

Eleventh Embodiment

Figure 14A:
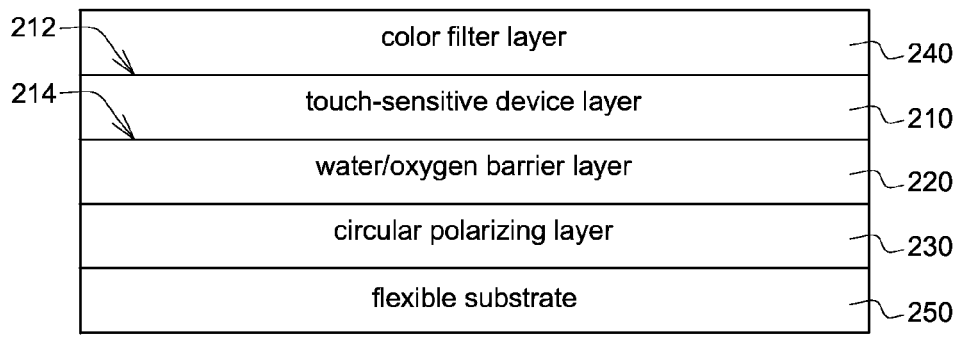
FIGS. 14A~14F respectively are assembly diagrams of a touch sensing film structure with water/oxygen barrier, circular polarizing and color filtering functions.
Figure 14B:
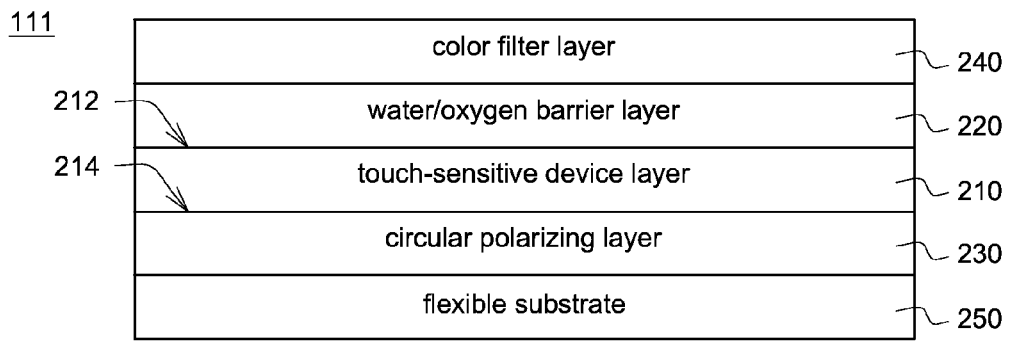
Figure 14C:
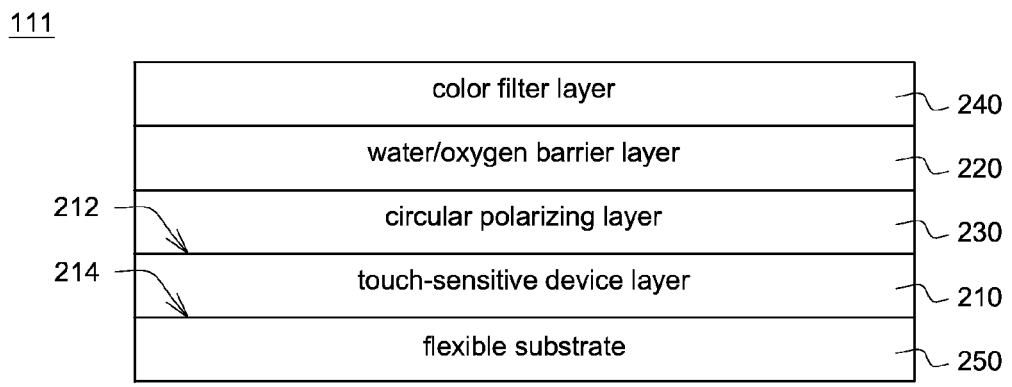
Figure 14D:
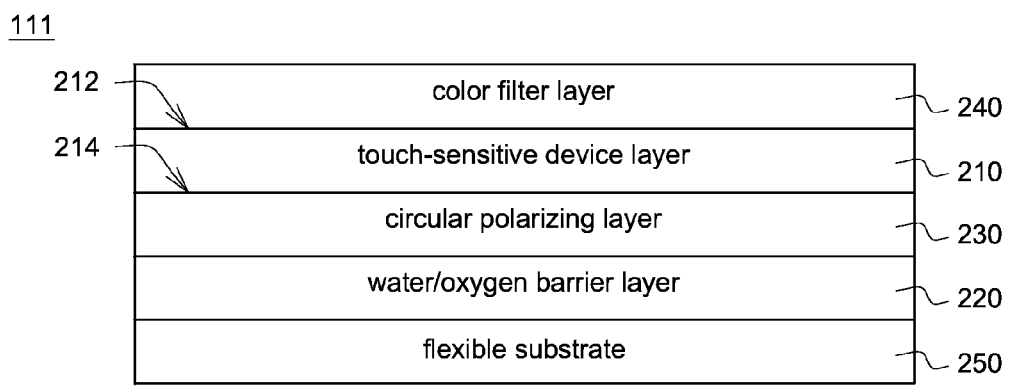

FIGS. 14A~14F respectively are assembly diagrams of a touch sensing film structure 111 with water/oxygen barrier, circular polarizing and color filtering functions. As indicated in FIG. 14A, the touch-sensitive device layer 210 has a first surface 212 and a second surface 214, the color filter layer 240 is formed on the first surface 212 of the touch-sensitive device layer 210, the water/oxygen barrier layer 220 is located between the touch-sensitive device layer 210 and the circular polarizing layer 230, and the circular polarizing layer 230 is located between the water/oxygen barrier layer 220 and the flexible substrate 250. Or, as indicated in FIG. 14D, the circular polarizing layer 230 is located between the touch-sensitive device layer 210 and the water/oxygen barrier layer 220, and the water/oxygen barrier layer 220 is located between the circular polarizing layer 230 and the flexible substrate 250.

Figure 14E:
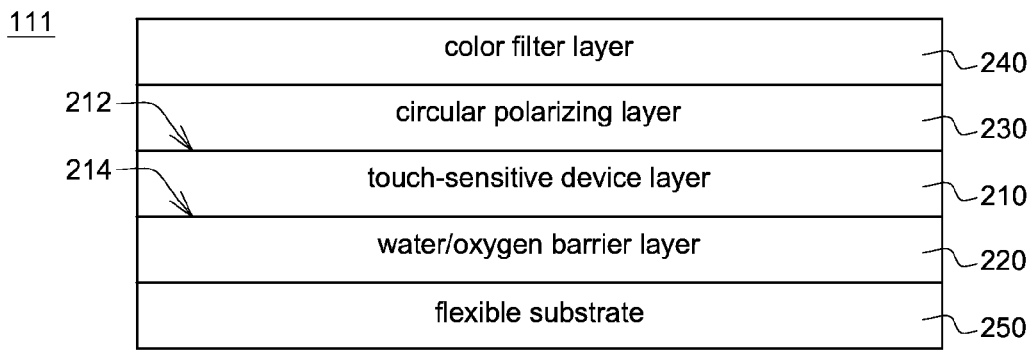

As indicated in FIG. 14B, the color filter layer 240 is formed on the water/oxygen barrier layer 220, the water/oxygen barrier layer 220 is formed on the first surface 212 of the touch-sensitive device layer 210, the circular polarizing layer 230 is located between the touch-sensitive device layer 210 and the flexible substrate 250. Or, as indicated in FIG. 14E, the circular polarizing layer 230 is formed on the first surface 212 of the touch-sensitive device layer 210, the water/oxygen barrier layer 220 is located between the touch-sensitive device layer 210 and the flexible substrate 250.

Figure 14F:
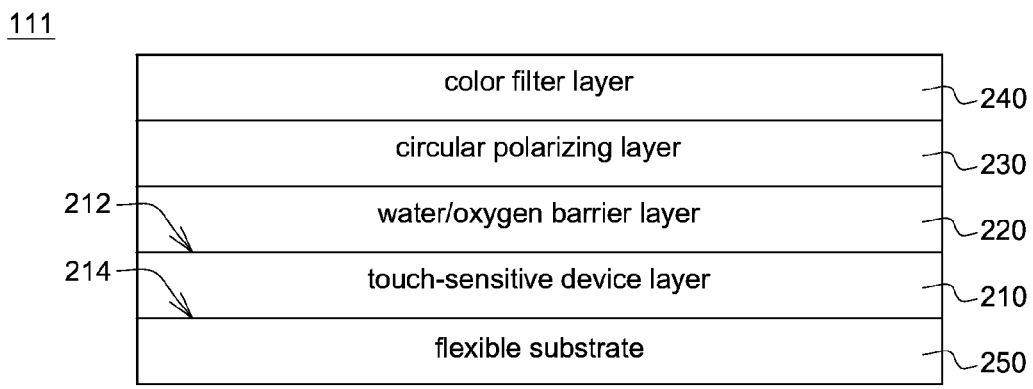

As indicated in FIG. 14C, the water/oxygen barrier layer 220 is located between the color filter layer 240 and the circular polarizing layer 230, the circular polarizing layer 230 is located between the water/oxygen barrier layer 220 and the first surface 212 of the touch-sensitive device layer 210, and the touch-sensitive device layer 210 is located between the circular polarizing layer 230 and the flexible substrate 250. Or, as indicated in FIG. 14F, the water/oxygen barrier layer 220 is located between the circular polarizing layer 230 and the first surface 212 of the touch-sensitive device layer 210, and the touch-sensitive device layer 210 is located between the water/oxygen barrier layer 220 and the flexible substrate 250.

Twelfth Embodiment

Figure 15A:
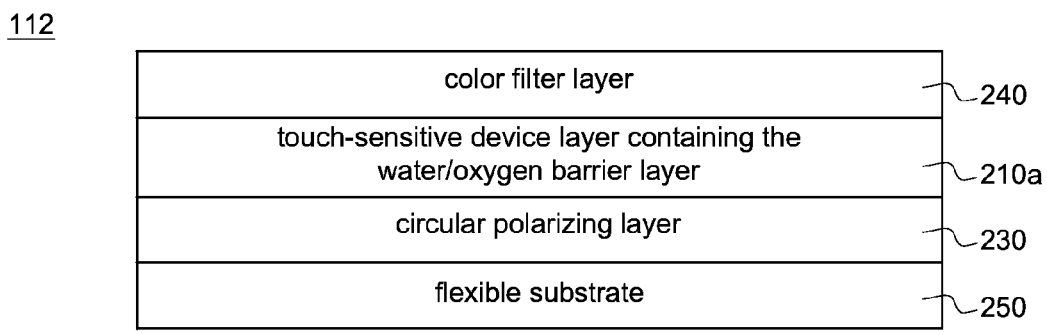
FIGS. 15A~15F respectively are assembly diagrams of a touch sensing film structure with water/oxygen barrier, circular polarizing and color filtering functions.
Figure 15B:
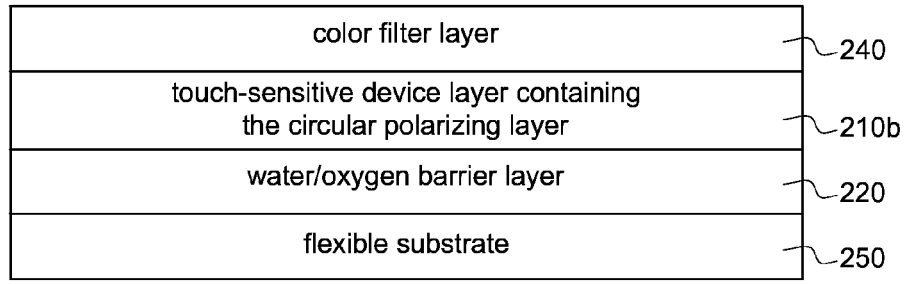
Figure 15C:
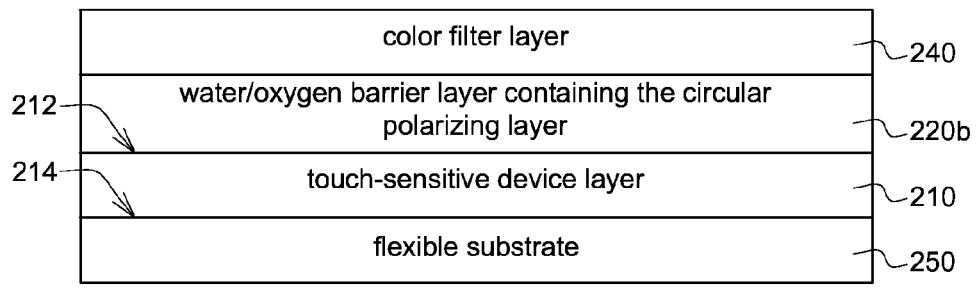
Figure 15D:
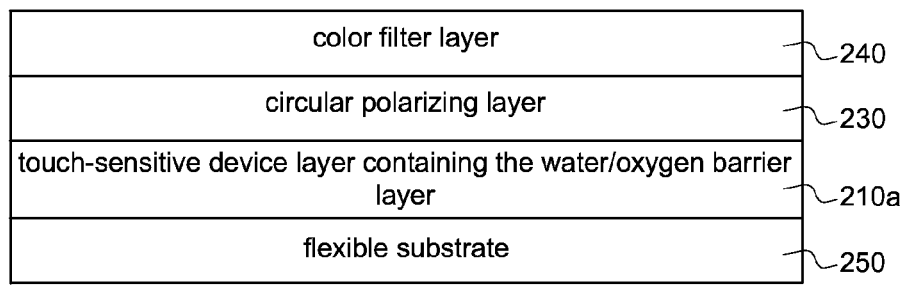

FIGS. 15A~15F respectively are assembly diagrams of a touch sensing film structure 112 with water/oxygen barrier, circular polarizing and color filtering functions. As indicated in FIG. 15A, the water/oxygen barrier layer 220 can be contained in the touch-sensitive device layer 210 to form a touch-sensitive device layer containing the water/oxygen barrier layer (210a), that is, a multi-function layer is located between the color filter layer 240 and the circular polarizing layer 230. Or, as indicated in FIG. 15D, the multi-function layer (the touch-sensitive device layer containing the water/oxygen barrier layer (210a)) is located between the circular polarizing layer 230 and the flexible substrate 250.

Figure 15E:
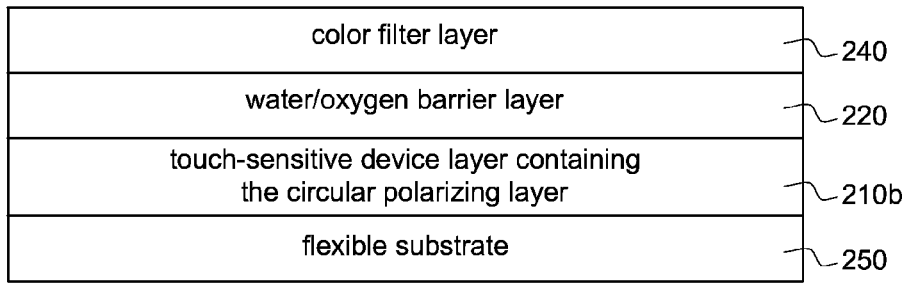

As indicated in FIG. 15B, the circular polarizing layer 230 can be contained in the touch-sensitive device layer 210 to form a touch-sensitive device layer containing the circular polarizing layer (210b), that is, a multi-function layer is located between the water/oxygen barrier layer 220 and the color filter layer 240. Or, as indicated in FIG. 15E, the multi-function layer (the touch-sensitive device layer containing the circular polarizing layer (210b)) is located between the water/oxygen barrier layer 220 and the flexible substrate 250.

Figure 15F:
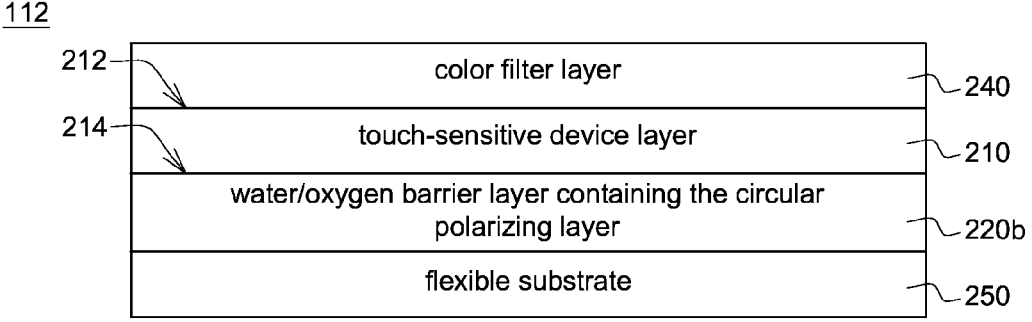

As indicated in FIG. 15C, the circular polarizing layer 230 can be contained in the water/oxygen barrier layer 220 to form a water/oxygen barrier layer containing the circular polarizing layer (220b), that is, a multi-function layer is located between the color filter layer 240 and the touch-sensitive device layer 210. Or, as indicated in FIG. 15F, the multi-function layer (the water/oxygen barrier layer containing the circular polarizing layer (220b)) is located between the touch-sensitive device layer 210 and the flexible substrate 250.

Thirteenth Embodiment

Figure 16A:
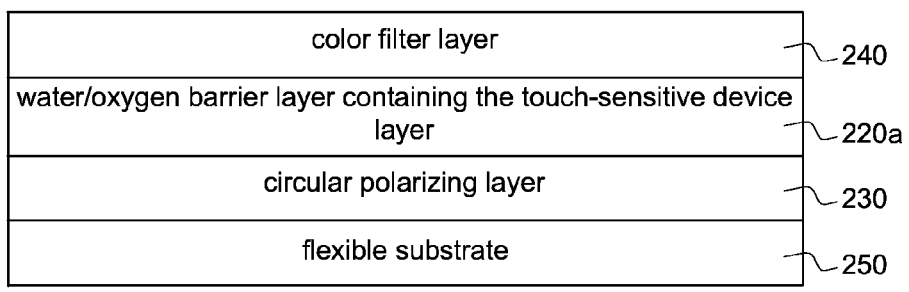
FIGS. 16A~16F respectively are assembly diagrams of a touch sensing film structure with water/oxygen barrier, circular polarizing and color filtering functions.
Figure 16B:
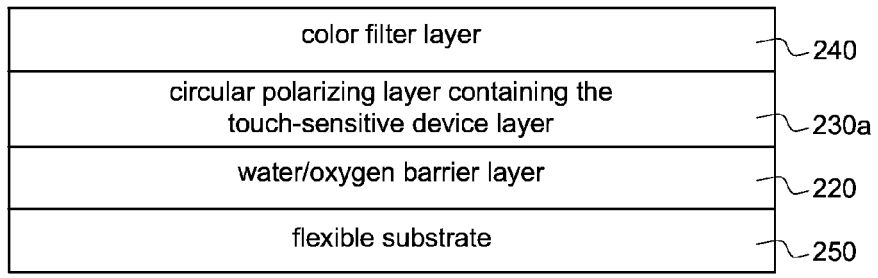
Figure 16C:
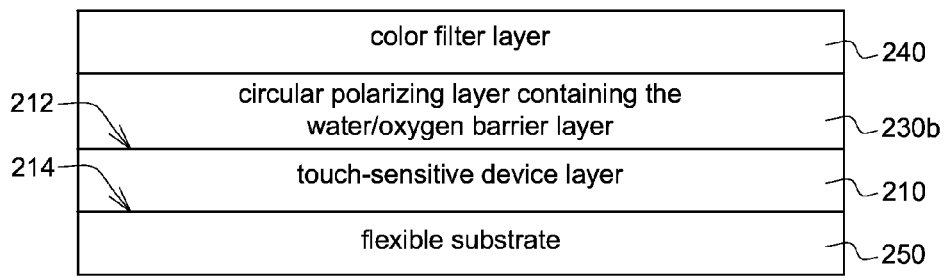
Figure 16D:
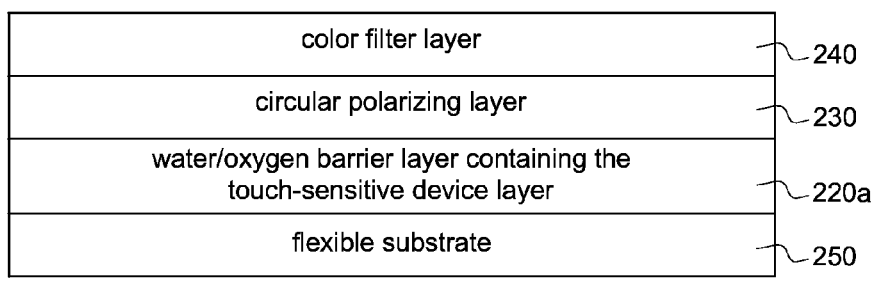

FIGS. 16A~16F respectively are assembly diagrams of a touch sensing film structure 113 with water/oxygen barrier, circular polarizing and color filtering functions. As indicated in FIG. 16A, the touch-sensitive device layer 210 can be contained in the water/oxygen barrier layer 220 to form a water/oxygen barrier layer containing the touch-sensitive device layer (220a), that is, a multi-function layer is located between the color filter layer 240 and the circular polarizing layer 230. Or, as indicated in FIG. 16D, the multi-function layer (the water/oxygen barrier layer containing the touch-sensitive device layer (220a)) is located between the circular polarizing layer 230 and the flexible substrate 250.

Figure 16E:
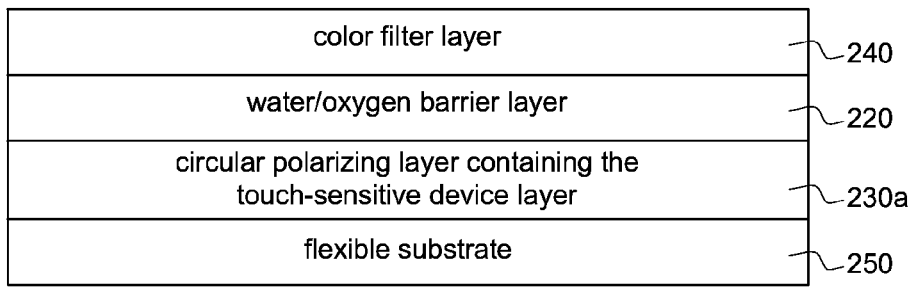

As indicated in FIG. 16B, the touch-sensitive device layer 210 can be contained in the circular polarizing layer 230 to form a circular polarizing layer containing the touch-sensitive device layer (230a), that is, a multi-function layer is located between the water/oxygen barrier layer 220 and the color filter layer 240. Or, as indicated in FIG. 16E, the multi-function layer (the circular polarizing layer containing the touch-sensitive device layer (230a)) is located between the water/oxygen barrier layer 220 and the flexible substrate 250.

Figure 16F:
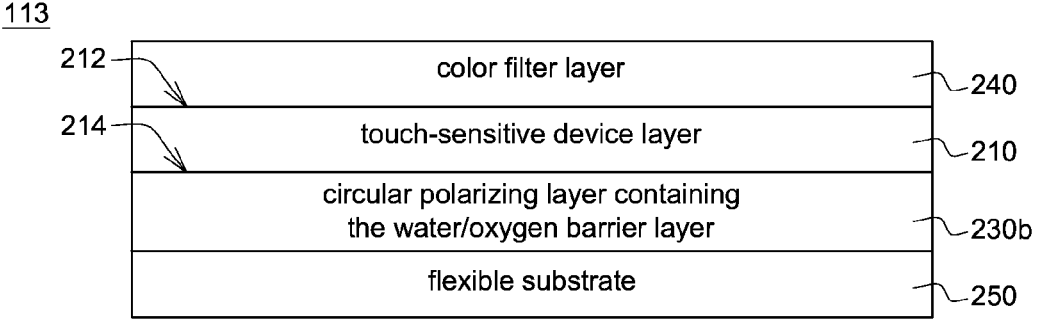

As indicated in FIG. 16C, the water/oxygen barrier layer 220 can be contained in the circular polarizing layer 230 to form a circular polarizing layer containing the water/oxygen barrier layer (230b), that is, a multi-function layer is located between the color filter layer 240 and the touch-sensitive device layer 210. Or, as indicated in FIG. 16F, the multi-function layer (the circular polarizing layer containing the water/oxygen barrier layer (230b)) is located between the touch-sensitive device layer 210 and the flexible substrate 250.

Fourteenth Embodiment

Figure 17A:
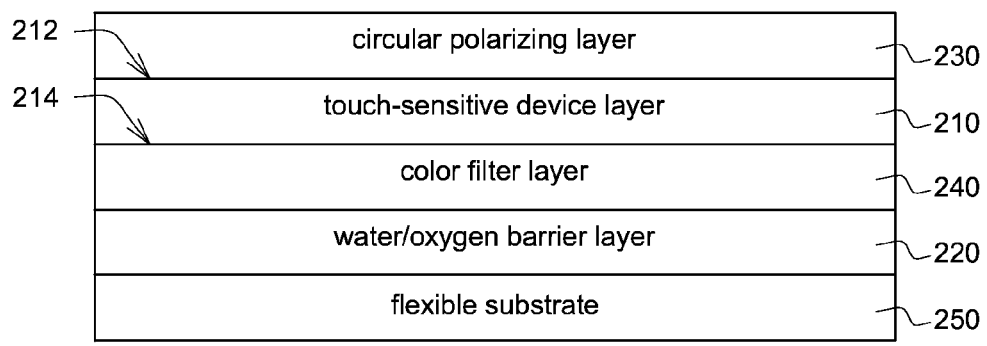
FIGS. 17A~17F respectively are assembly diagrams of a touch sensing film structure with water/oxygen barrier, circular polarizing and color filtering functions.
Figure 17B:
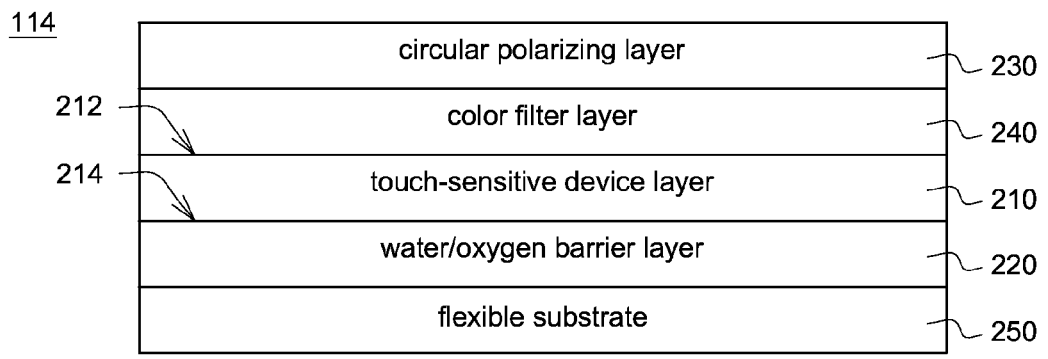
Figure 17C:
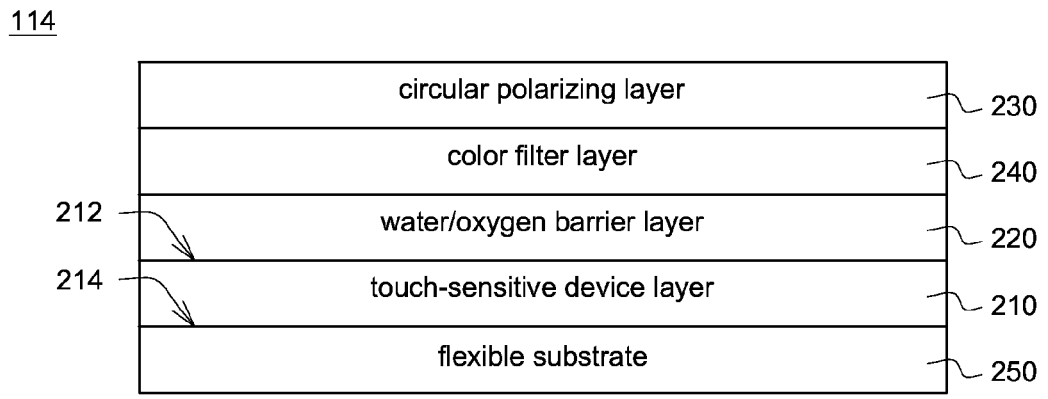
Figure 17D:
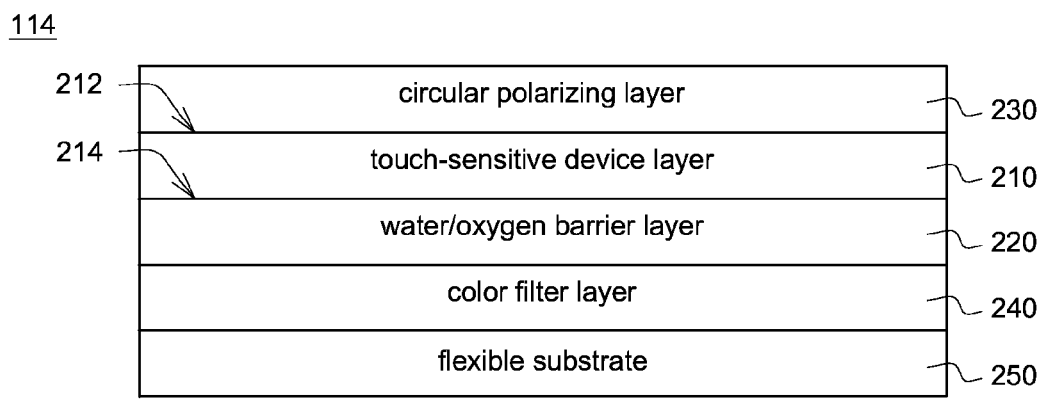

FIGS. 17A~17F respectively are assembly diagrams of a touch sensing film structure 114 with water/oxygen barrier, circular polarizing and color filtering functions. As indicated in FIG. 17A, the touch-sensitive device layer 210 has a first surface 212 and a second surface 214, the circular polarizing layer 230 is formed on the touch-sensitive device layer 210, the color filter layer 240 is located between the second surface 214 of the touch-sensitive device layer 210 and the water/oxygen barrier layer 220, the water/oxygen barrier layer 220 is located between the color filter layer 240 and the flexible substrate 250. Or, as indicated in FIG. 17D, the water/oxygen barrier layer 220 is located between the touch-sensitive device layer 210 and the color filter layer 240, and the color filter layer 240 is located between the water/oxygen barrier layer 220 and the flexible substrate 250.

Figure 17E:
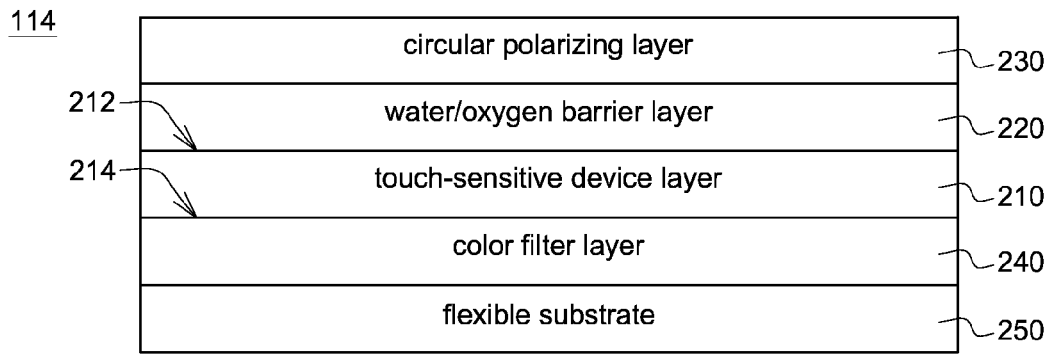

As indicated in FIG. 17B, the circular polarizing layer 230 is formed on the color filter layer 240, the touch-sensitive device layer 210 is located between the color filter layer 240 and the water/oxygen barrier layer 220, the water/oxygen barrier layer 220 is located between the touch-sensitive device layer 210 and the flexible substrate 250. Or, as indicated in FIG. 17E, the water/oxygen barrier layer 220 is located between the circular polarizing layer 230 and the first surface 212 of the touch-sensitive device layer 210, the color filter layer 240 is located between the touch-sensitive device layer 210 and the flexible substrate 250.

Figure 17F:
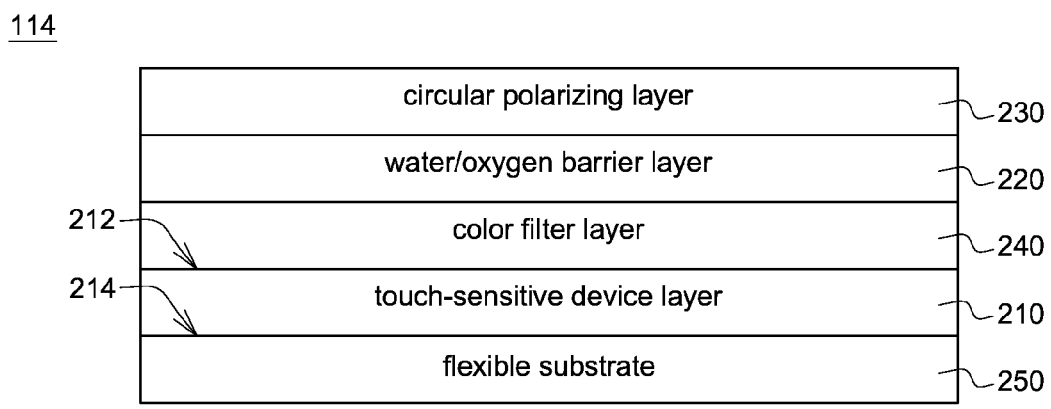

As indicated in FIG. 17C, the color filter layer 240 is located between the circular polarizing layer 230 and the water/oxygen barrier layer 220, the water/oxygen barrier layer 220 is located between the color filter layer 240 and the first surface 212 of the touch-sensitive device layer 210, and the touch-sensitive device layer 210 is located between the water/oxygen barrier layer 220 and the flexible substrate 250. Or, as indicated in FIG. 17F, the color filter layer 240 is formed between the water/oxygen barrier layer 220 and the first surface 212 of the touch-sensitive device layer 210, and the touch-sensitive device layer 210 is located between the color filter layer 240 and the flexible substrate 250.

Fifteenth Embodiment

Figure 18A:
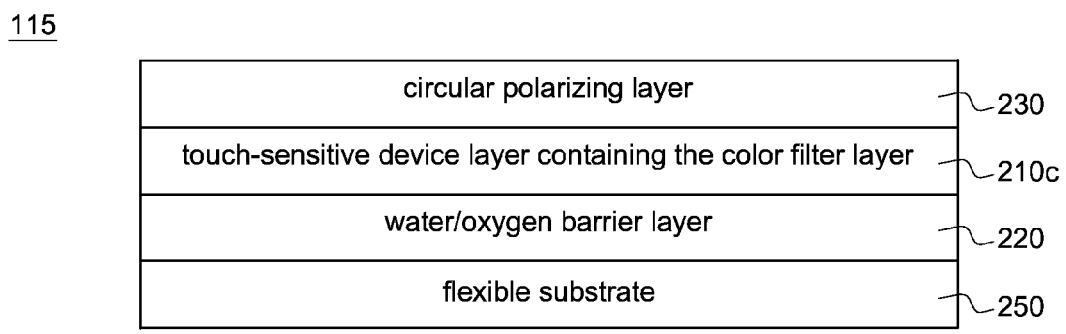
FIGS. 18A~18F respectively are assembly diagrams of a touch sensing film structure with water/oxygen barrier, circular polarizing and color filtering functions.
Figure 18B:
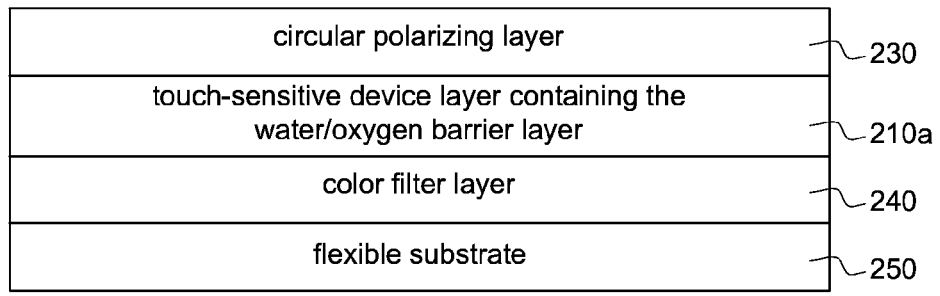
Figure 18C:
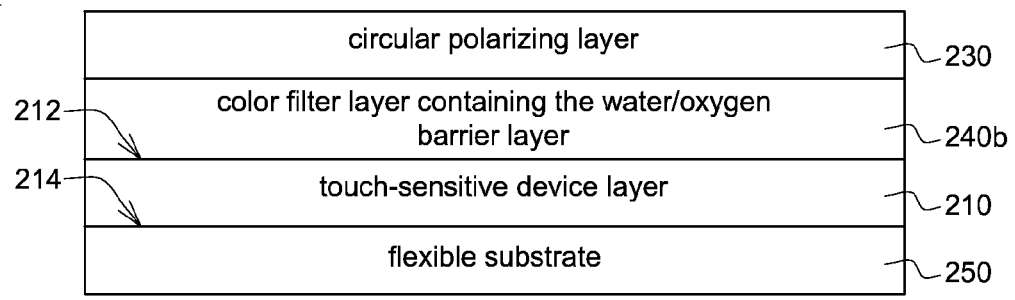
Figure 18D:
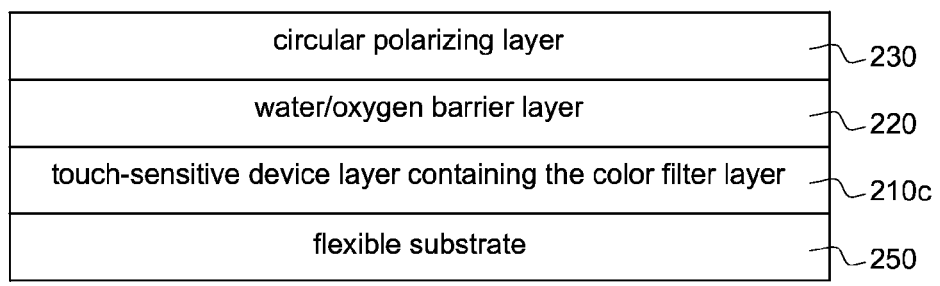

FIGS. 18A~18F respectively are assembly diagrams of a touch sensing film structure 115 with water/oxygen barrier, circular polarizing and color filtering functions. As indicated in FIG. 18A, the color filter layer 240 can be contained in the touch-sensitive device layer 210 to form a touch-sensitive device layer containing the color filter layer (210c), that is, a multi-function layer is located between the circular polarizing layer 230 and the water/oxygen barrier layer 220. Or, as indicated in FIG. 18D, the multi-function layer (the touch-sensitive device layer containing the color filter layer (210c)) is located between the water/oxygen barrier layer 220 and the flexible substrate 250.

Figure 18E:
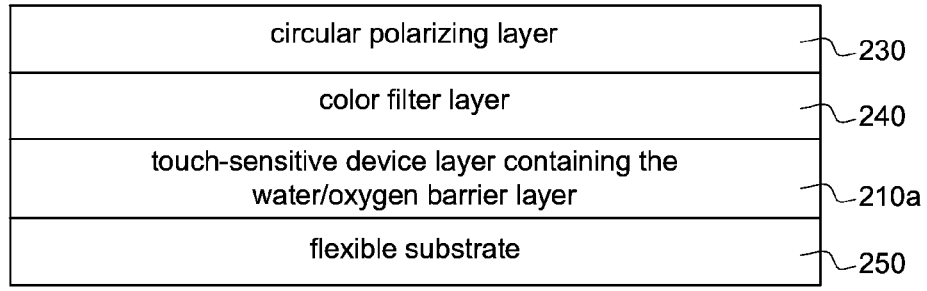

As indicated in FIG. 18B, the water/oxygen barrier layer 220 can be contained in the touch-sensitive device layer 210 to form a touch-sensitive device layer containing the water/oxygen barrier layer (210a), that is, a multi-function layer is located between the circular polarizing layer 230 and the color filter layer 240. Or, as indicated in FIG. 18E, the multi-function layer (the touch-sensitive device layer containing the water/oxygen barrier layer (210a)) is located between the color filter layer 240 and the flexible substrate 250.

Figure 18F:
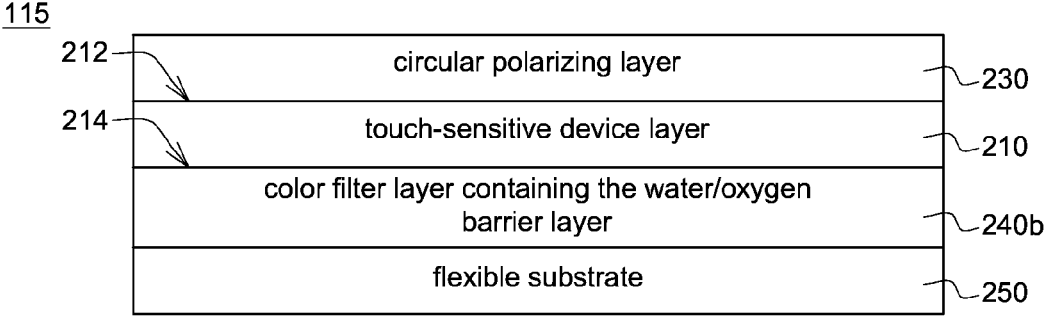

As indicated in FIG. 18C, the water/oxygen barrier layer 220 can be contained in the color filter layer 240 to form a color filter layer containing the water/oxygen barrier layer (240b), that is, a multi-function layer is located between the circular polarizing layer 230 and the touch-sensitive device layer 210. Or, as indicated in FIG. 18F, the multi-function layer (the color filter layer containing the water/oxygen barrier layer (240b)) is located between the touch-sensitive device layer 210 and the flexible substrate 250.

Sixteenth Embodiment

Figure 19A:
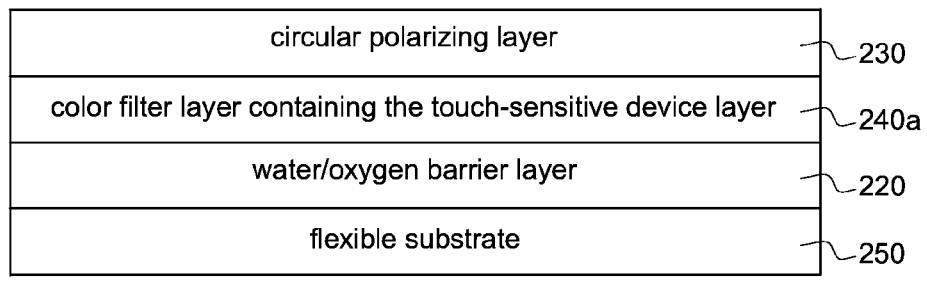
FIGS. 19A~19F respectively are assembly diagrams of a touch sensing film structure with water/oxygen barrier, circular polarizing and color filtering functions.
Figure 19B:
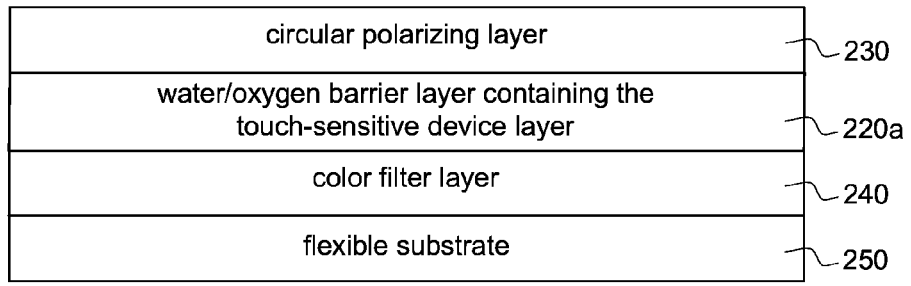
Figure 19C:
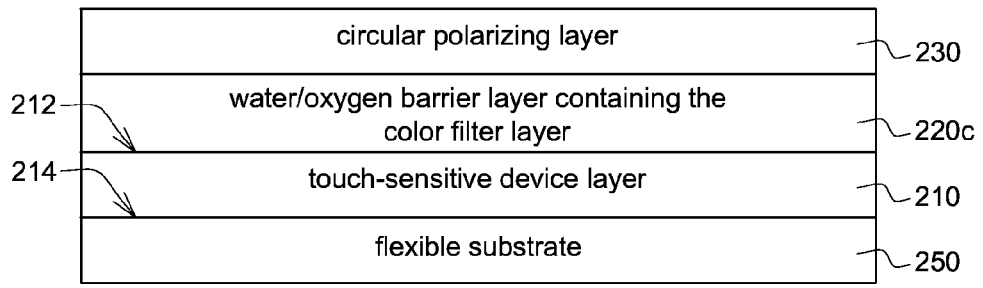
Figure 19D:
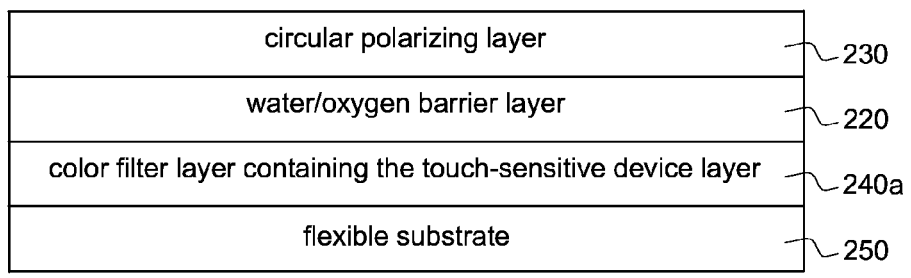

FIGS. 19A~19F respectively are assembly diagrams of a touch sensing film structure 116 with water/oxygen barrier, circular polarizing and color filtering functions. As indicated in FIG. 19A, the touch-sensitive device layer 210 can be contained in the color filter layer 240 to form a color filter layer containing the touch-sensitive device layer (240a), that is, a multi-function layer is located between the circular polarizing layer 230 and the water/oxygen barrier layer 220. Or, as indicated in FIG. 19D, the multi-function layer (the color filter layer containing the touch-sensitive device layer (240a)) is located between the water/oxygen barrier layer 220 and the flexible substrate 250.

Figure 19E:
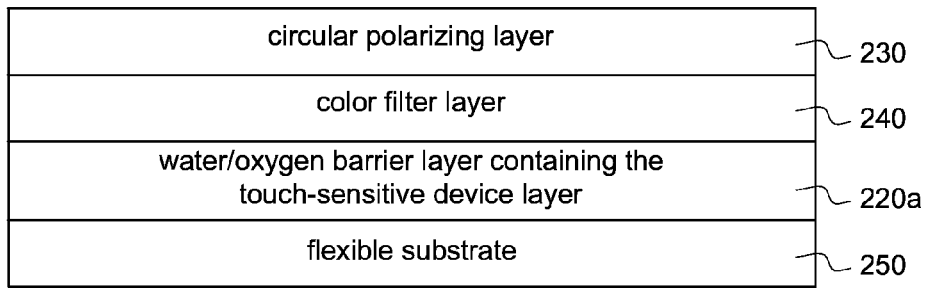

As indicated in FIG. 19B, the touch-sensitive device layer 210 can be contained in the water/oxygen barrier layer 220 to form a water/oxygen barrier layer containing the touch-sensitive device layer (220a), that is, a multi-function layer is located between the circular polarizing layer 230 and the color filter layer 240. Or, as indicated in FIG. 19E, the multi-function layer (the water/oxygen barrier layer containing the touch-sensitive device layer (220a)) is located between the color filter layer 240 and the flexible substrate 250.

Figure 19F:
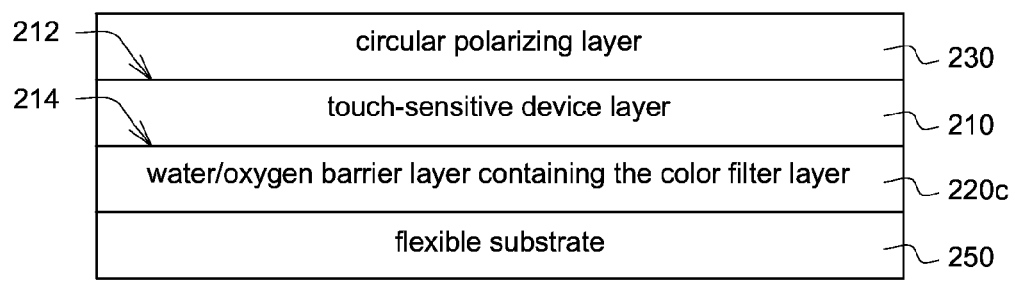

As indicated in FIG. 19C, the color filter layer 240 can be contained in the water/oxygen barrier layer 220 to form a water/oxygen barrier layer containing the color filter layer (220c), that is, a multi-function layer is located between the circular polarizing layer 230 and the touch-sensitive device layer 210. Or, as indicated in FIG. 19F, the multi-function layer (the water/oxygen barrier layer containing the color filter layer (220c)) is located between the touch-sensitive device layer 210 and the flexible substrate 250.

Seventh Embodiment

Figure 20A:
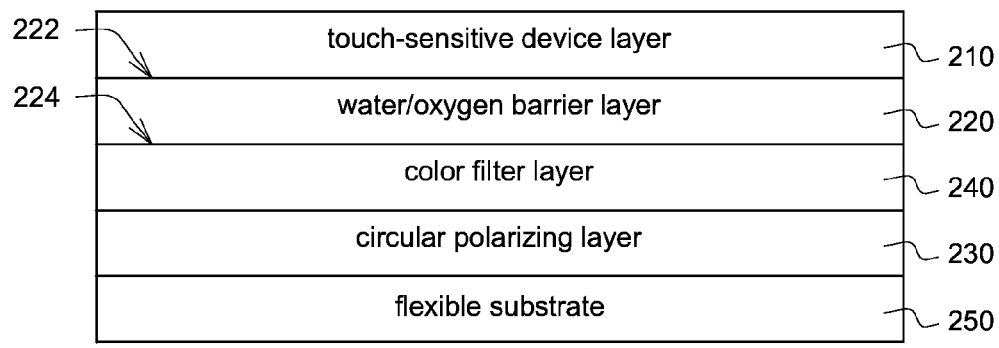
FIGS. 20A~20F respectively are assembly diagrams of a touch sensing film structure with water/oxygen barrier, circular polarizing and color filtering functions.
Figure 20B:
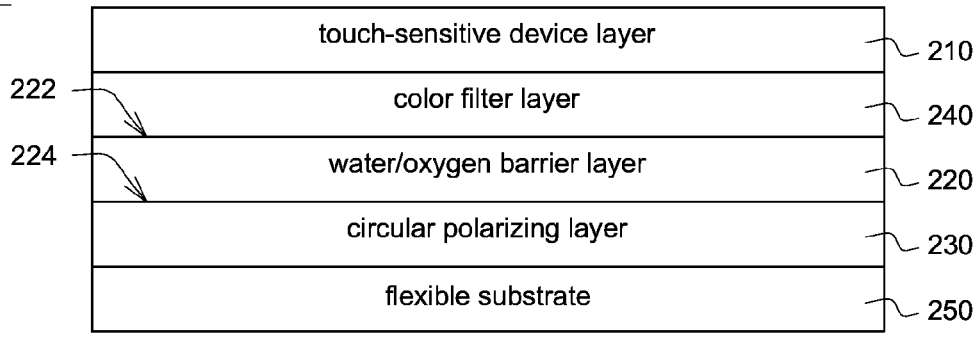
Figure 20C:
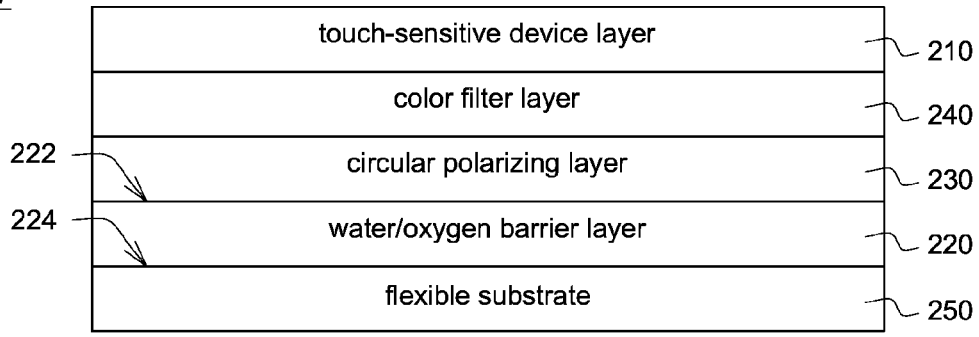
Figure 20D:
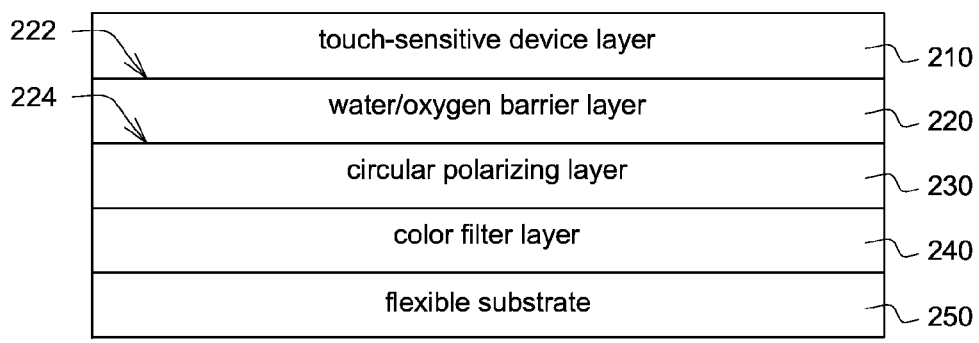

FIGS. 20A~20F respectively are assembly diagrams of a touch sensing film structure 117 with water/oxygen barrier, circular polarizing and color filtering functions. As indicated in FIG. 20A, the water/oxygen barrier layer 220 has a first surface 222 and a second surface 224, the touch-sensitive device layer 210 is formed on the first surface 222 of the water/oxygen barrier layer 220, the color filter layer 240 is located between the water/oxygen barrier layer 220 and the circular polarizing layer 230, and the circular polarizing layer 230 is located between the color filter layer 240 and the flexible substrate 250. Or, as indicated in FIG. 20D, the circular polarizing layer 230 is located between the water/oxygen barrier layer 220 and the color filter layer 240, and the color filter layer 240 is located between the circular polarizing layer 230 and the flexible substrate 250.

Figure 20E:
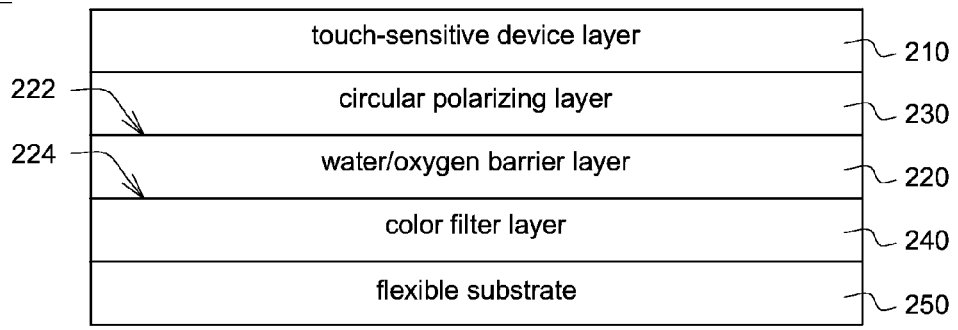

As indicated in FIG. 20B, the touch-sensitive device layer 210 is formed on the color filter layer 240, the water/oxygen barrier layer 220 is located between the color filter layer 240 and the circular polarizing layer 230, the circular polarizing layer 230 is located between the water/oxygen barrier layer 220 and the flexible substrate 250. Or, as indicated in FIG. 20E, the circular polarizing layer 230 is located between the touch-sensitive device layer 210 and the first surface 222 of the water/oxygen barrier layer 220, the color filter layer 240 is located between the water/oxygen barrier layer 220 and the flexible substrate 250.

Figure 20F:
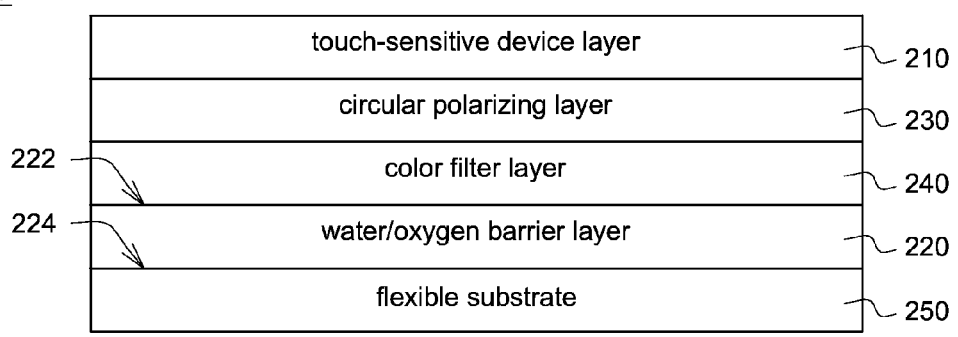

As indicated in FIG. 20C, the color filter layer 240 is located between the touch-sensitive device layer 210 and the circular polarizing layer 230, the circular polarizing layer 230 is located between the color filter layer 240 and the first surface 222 of the water/oxygen barrier layer 220, and the water/oxygen barrier layer 220 is located between the circular polarizing layer 230 and the flexible substrate 250. Or, as indicated in FIG. 20F, the color filter layer 240 is formed between the circular polarizing layer 230 and the first surface 222 of the water/oxygen barrier layer 220, and the water/oxygen barrier layer 220 is located between the color filter layer 240 and the flexible substrate 250.

Eighteenth Embodiment

Figure 21A:
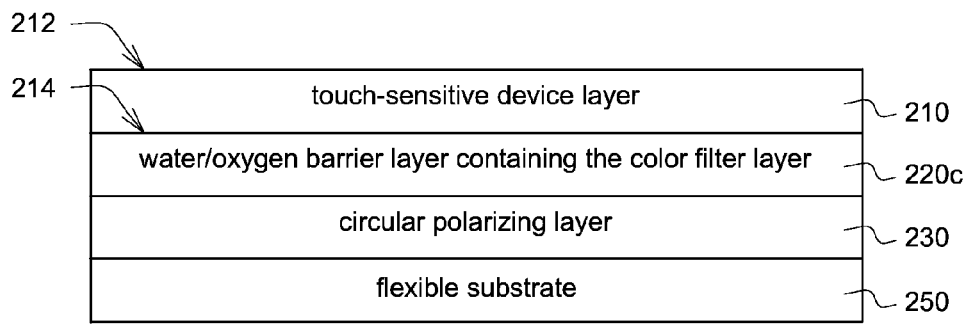
FIGS. 21A~21F respectively are assembly diagrams of a touch sensing film structure with water/oxygen barrier, circular polarizing and color filtering functions.
Figure 21B:
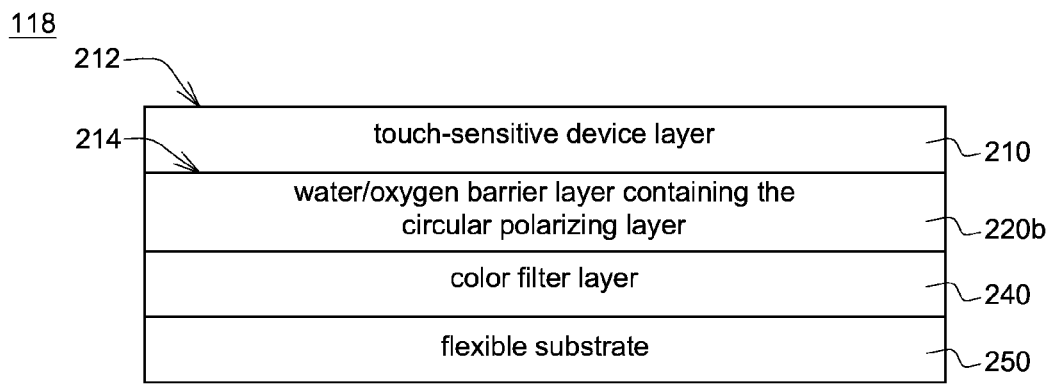
Figure 21C:
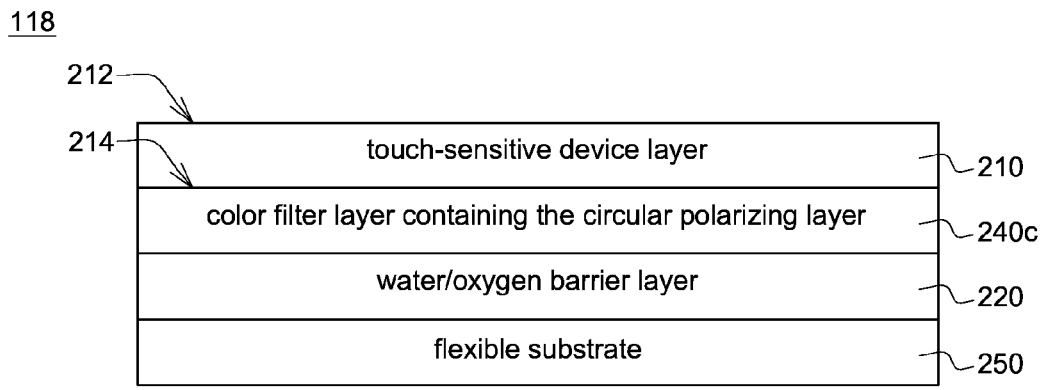
Figure 21D:
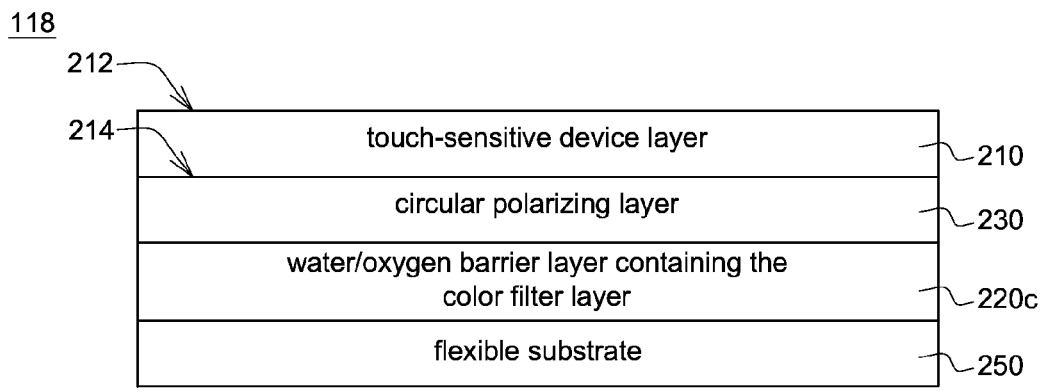

FIGS. 21A~21F respectively are assembly diagrams of a touch sensing film structure 118 with water/oxygen barrier, circular polarizing and color filtering functions. As indicated in FIG. 21A, the color filter layer 240 can be contained in the water/oxygen barrier layer 220 to form a water/oxygen barrier layer containing the color filter layer (220c), that is, a multi-function layer is located between the touch-sensitive device layer 210 and the circular polarizing layer 230. Or, as indicated in FIG. 21D, the multi-function layer (the water/oxygen barrier layer containing the color filter layer (220c)) is located between the circular polarizing layer 230 and the flexible substrate 250.

Figure 21E:
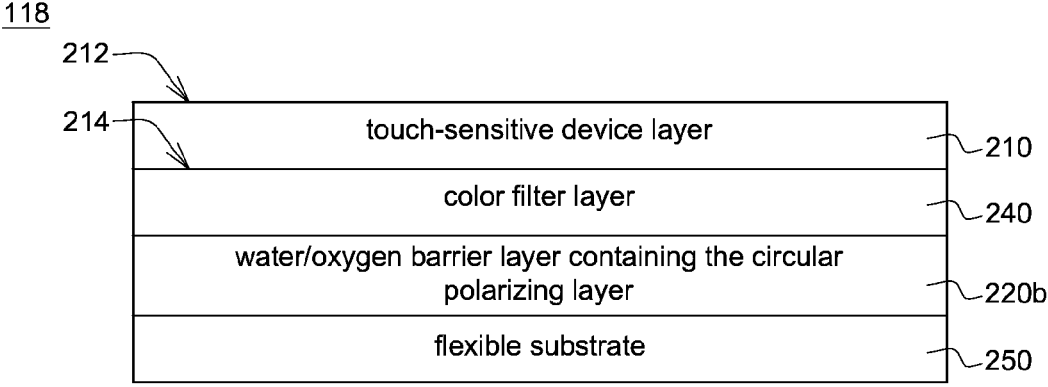

As indicated in FIG. 21B, the circular polarizing layer 230 can be contained in the water/oxygen barrier layer 220 to form a water/oxygen barrier layer containing the circular polarizing layer (220b), that is, a multi-function layer is located between the touch-sensitive device layer 210 and the color filter layer 240. Or, as indicated in FIG. 21E, the multi-function layer (the water/oxygen barrier layer containing the circular polarizing layer (220b)) is located between the color filter layer 240 and the flexible substrate 250.

Figure 21F:
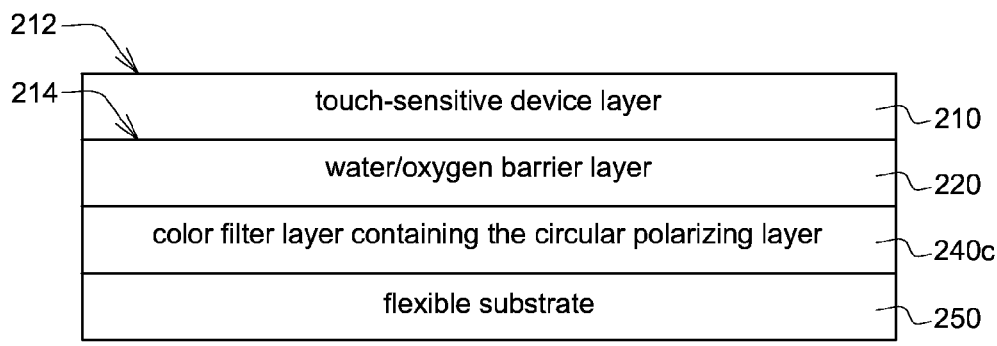

As indicated in FIG. 21C, the circular polarizing layer 230 can be contained in the color filter layer 240 to form a color filter layer containing the circular polarizing layer (240c), that is, a multi-function layer is located between the touch-sensitive device layer 210 and the water/oxygen barrier layer 220. Or, as indicated in FIG. 21F, the multi-function layer (the color filter layer containing the circular polarizing layer (240c)) is located between the water/oxygen barrier layer 220 and the flexible substrate 250.

Nineteenth Embodiment

Figure 22A:
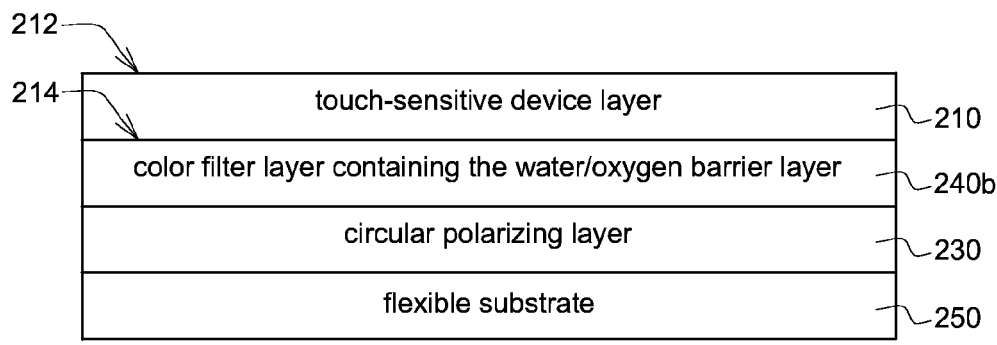
FIGS. 22A~22F respectively are assembly diagrams of a touch sensing film structure with water/oxygen barrier, circular polarizing and color filtering functions.
Figure 22B:
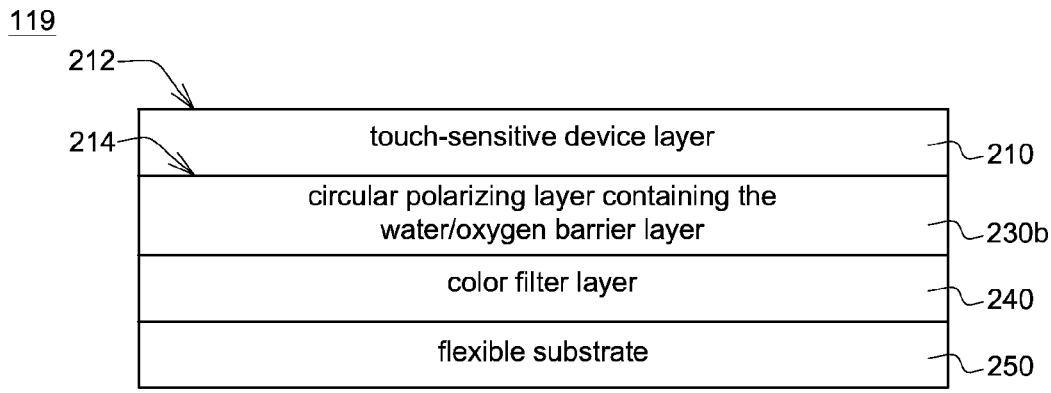
Figure 22C:
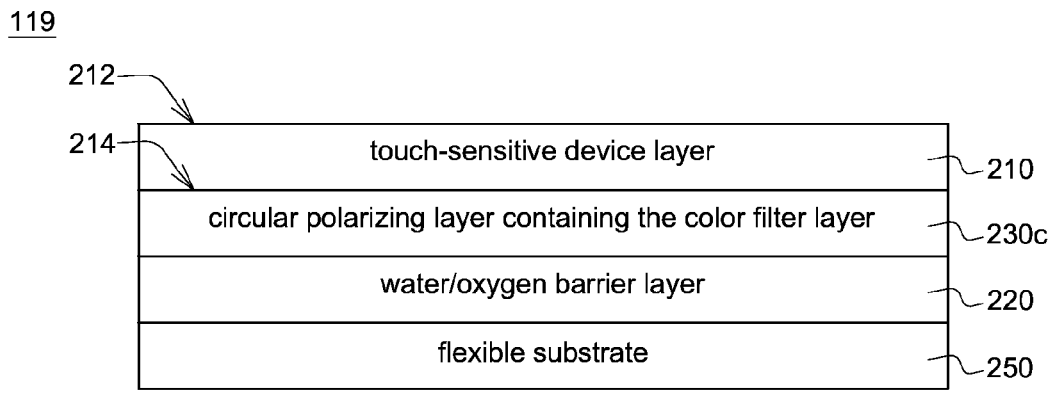
Figure 22D:
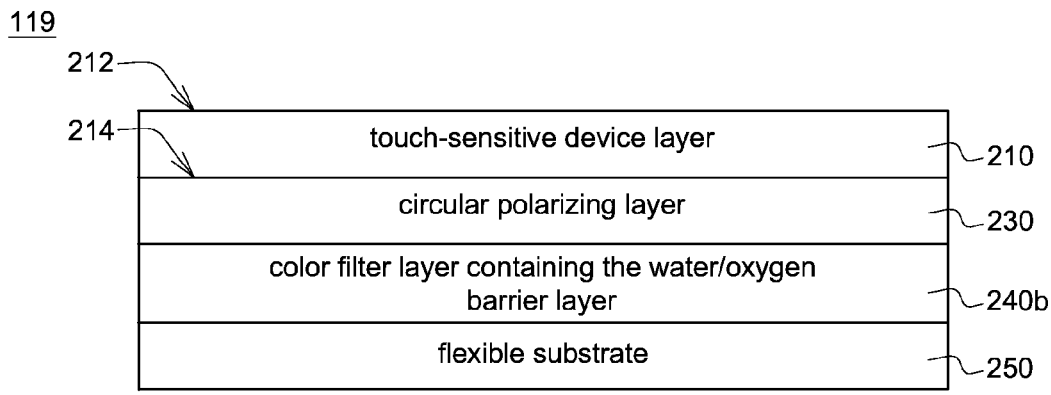

FIGS. 22A~22F respectively are assembly diagrams of a touch sensing film structure 119 with water/oxygen barrier, circular polarizing and color filtering functions. As indicated in FIG. 22A, the water/oxygen barrier layer 220 can be contained in the color filter layer 240 to form a color filter layer containing the water/oxygen barrier layer (240b), that is, a multi-function layer is located between the touch-sensitive device layer 210 and the circular polarizing layer 230. Or, as indicated in FIG. 22D, the multi-function layer (the color filter layer containing the water/oxygen barrier layer (240b)) is located between the circular polarizing layer 230 and the flexible substrate 250.

Figure 22E:
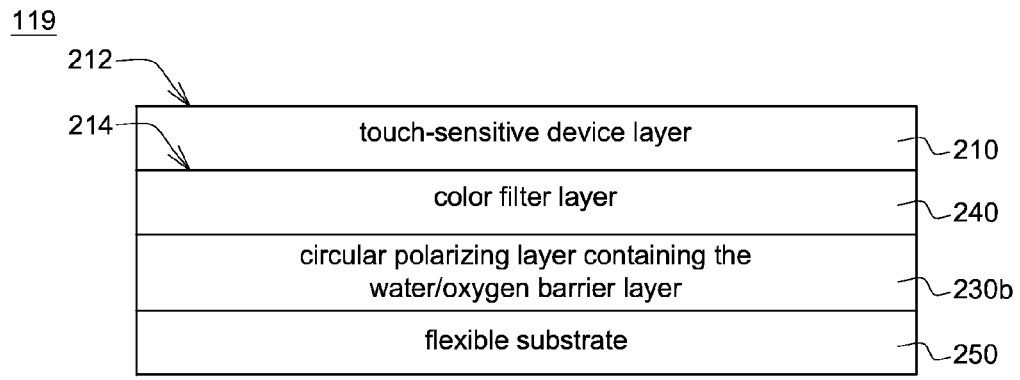

As indicated in FIG. 22B, the water/oxygen barrier layer 220 can be contained in the circular polarizing layer 230 to form a circular polarizing layer containing the water/oxygen barrier layer (230b), that is, a multi-function layer is located between the touch-sensitive device layer 210 and the color filter layer 240. Or, as indicated in FIG. 22E, the multi-function layer (the circular polarizing layer containing the water/oxygen barrier layer (230b)) is located between the color filter layer 240 and the flexible substrate 250.

Figure 22F:
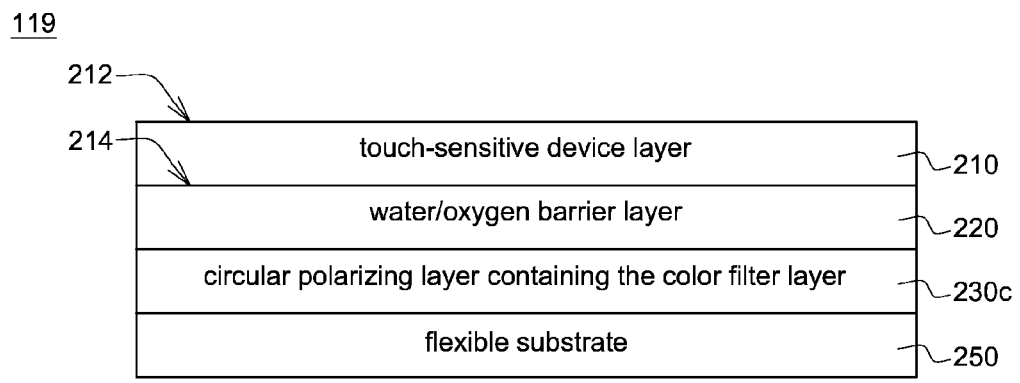

As indicated in FIG. 22C, the color filter layer 240 can be contained in the circular polarizing layer 230 to form a circular polarizing layer containing the color filter layer (230c), that is, a multi-function layer is located between the touch-sensitive device layer 210 and the water/oxygen barrier layer 220. Or, as indicated in FIG. 22F, the multi-function layer (the circular polarizing layer containing the color filter layer (230c)) is located between the water/oxygen barrier layer 220 and the flexible substrate 250.

Twentieth Embodiment

Figure 23A:
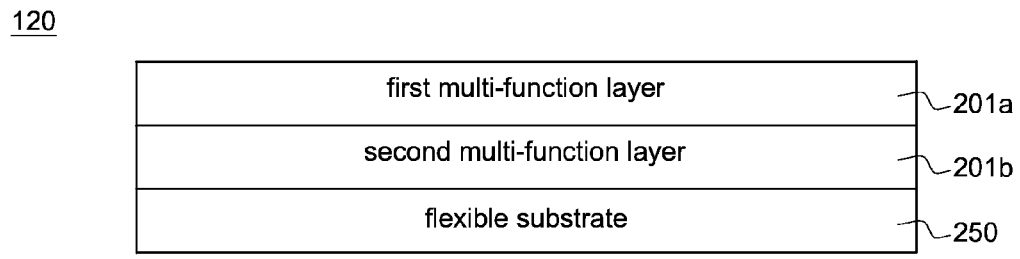
FIGS. 23A~23C respectively are assembly diagrams of a touch sensing film structure with water/oxygen barrier, circular polarizing and color filtering functions.
Figure 23B:
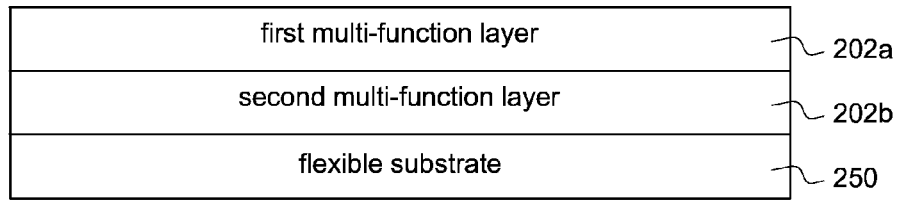
Figure 23C:
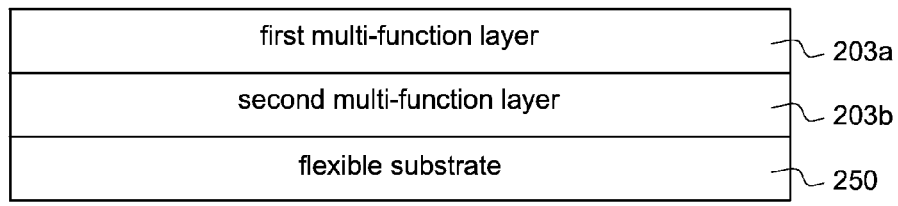

FIGS. 23A~23C respectively are assembly diagrams of a touch sensing film structure 120 with water/oxygen barrier, circular polarizing and color filtering functions. As indicated in FIG. 23A, the touch-sensitive device layer 210 can be integrated with the water/oxygen barrier layer 220 to form a first multi-function layer 201a with touch-sensitive and barrier functions, and the color filter layer 240 can be integrated with the circular polarizing layer 230 to form a second multi-function layer 201b with color filtering and circular polarizing functions.

Or, as indicated in FIG. 23B, the touch-sensitive device layer 210 can be integrated with the circular polarizing layer 230 to form a first multi-function layer 202a with touch-sensitive and circular polarizing functions, and the color filter layer 240 can be integrated with the water/oxygen barrier layer 220 to form a second multi-function layer 202b with color filtering and barrier functions.

Or, as indicated in FIG. 23C, the touch-sensitive device layer 210 can be integrated with the color filter layer 240 to form a first multi-function layer 203a with touch-sensitive and color filtering functions, and the circular polarizing layer 230 can be integrated with the water/oxygen barrier layer 220 to form a second multi-function layer 203b with circular polarizing and water/oxygen barrier functions. The first and the second multi-function layers can stack with the flexible substrate 250, but the sequence of stack is not restrictive.

Figure 23D:
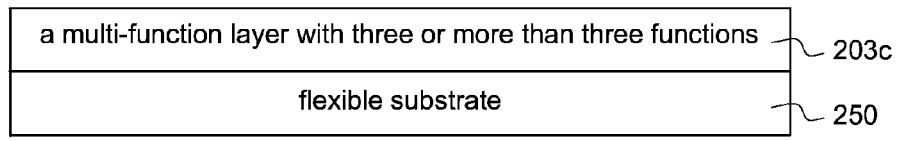
FIG. 23D is a schematic diagram of a multi-function layer with three or more than three functions.

FIG. 23D is a schematic diagram of a multi-function layer 203c with three or more than three functions. For example, the touch-sensitive device layer 210 can be integrated with the water/oxygen barrier layer 220 and the circular polarizing layer 230 to form a multi-function layer 203c with touch-sensitive, water/oxygen barrier and circular polarizing functions. Or, the touch-sensitive device layer 210 can be integrated with the water/oxygen barrier layer 220 and the color filtering layer 240 to form a multi-function layer 203c with touch-sensitive, water/oxygen barrier and color filtering functions. Or, the water/oxygen barrier layer 220 can be integrated with the circular polarizing layer 230 and the color filtering layer 240 to form a multi-function layer 203c with water/oxygen barrier, circular polarizing and color filtering functions. Or, the touch-sensitive device layer 210 can be integrated with the circular polarizing layer 230 and the color filtering layer 240 to form a multi-function layer 203c with touch-sensitive, circular polarizing and color filtering functions. Therefore, three or all of touch-sensitive device layer 210, the water/oxygen barrier layer 220, the circular polarizing layer 230 and the color filtering layer 240 can be integrated to form a multi-function layer 203c with three or all functions, and stack with the flexible substrate 250.

Twenty-First Embodiment

Figure 24A:
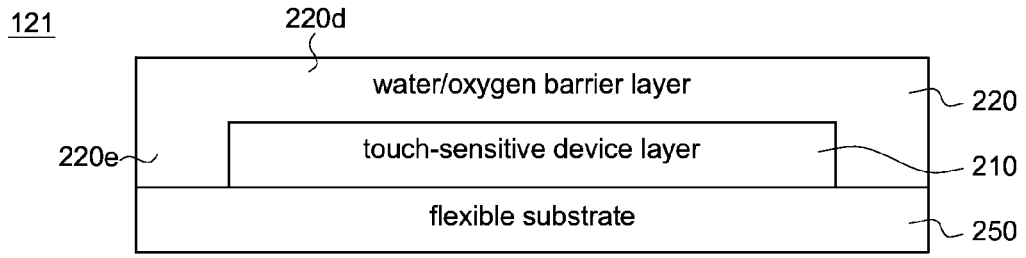
FIGS. 24A~24D respectively are schematic diagrams of a touch sensing film structure whose barrier layer being an inverse U-shaped structure.

FIGS. 24A~24D respectively are schematic diagrams of a touch sensing film structure 121 whose water/oxygen barrier layer 220 being an inverse U-shaped structure. As indicated in FIG. 24A, the touch sensing film structure comprises a touch-sensitive device layer 210, a water/oxygen barrier layer 220 and a flexible substrate 250. The water/oxygen barrier layer 220 encapsulates the touch-sensitive device layer 210 to avoid water and/or oxygen infiltrating to the touch sensing film structure 121 via the side surfaces of the touch-sensitive device layer 210. That is, the water/oxygen barrier layer 220 may comprise a top water/oxygen barrier layer 220d and a peripheral water/oxygen barrier layer 220e, respectively covering a top side and lateral sides of the touch-sensitive device layer 210.

Figure 24B:
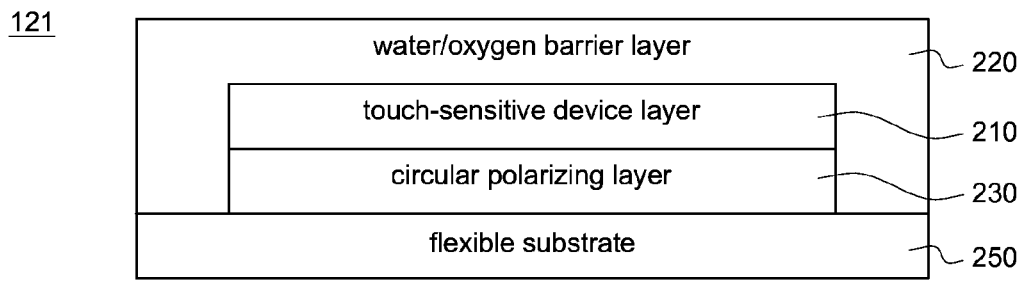

As indicated in FIG. 24B, the touch sensing film structure 121 comprises a touch-sensitive device layer 210, a water/oxygen barrier layer 220, a circular polarizing layer 230 and a flexible substrate 250. The water/oxygen barrier layer 220 encapsulates the touch-sensitive device layer 210 and the circular polarizing layer 230 or a multi-function layer (not illustrated) formed by integrating the circular polarizing layer 230 with the touch-sensitive device layer 210. Then, the above layers further stack with the flexible substrate 250 to avoid water and/or oxygen infiltrating to the touch sensing film structure 121 via the side surfaces of the touch-sensitive device layer 210 and/or the circular polarizing layer 230.

Figure 24C:
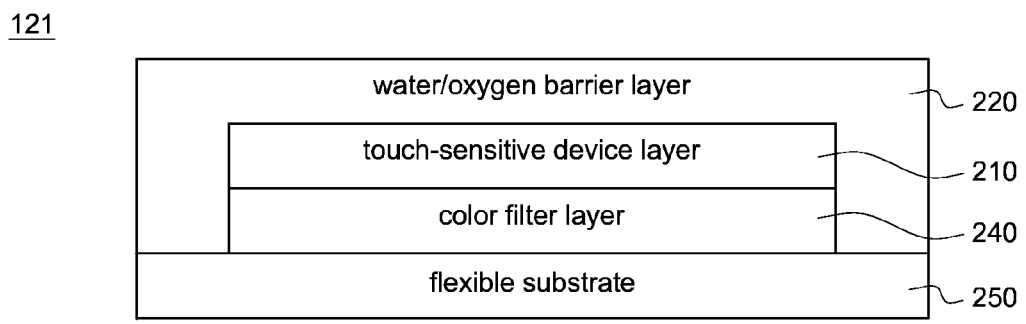

As indicated in FIG. 24C, the touch sensing film structure 121 comprises a touch-sensitive device layer 210, a water/oxygen barrier layer 220, a color filter layer 240 and a flexible substrate 250. The water/oxygen barrier layer 220 encapsulates the touch-sensitive device layer 210 and the color filter layer 240 or a multi-function layer (not illustrated) formed by integrating the color filter layer 240 with the touch-sensitive device layer 210. Then, the above layers further stack with the flexible substrate 250 to avoid water and/or oxygen infiltrating to the touch sensing film structure 121 via the side surfaces of the touch-sensitive device layer 210 and/or the color filter layer 240.

Figure 24D:
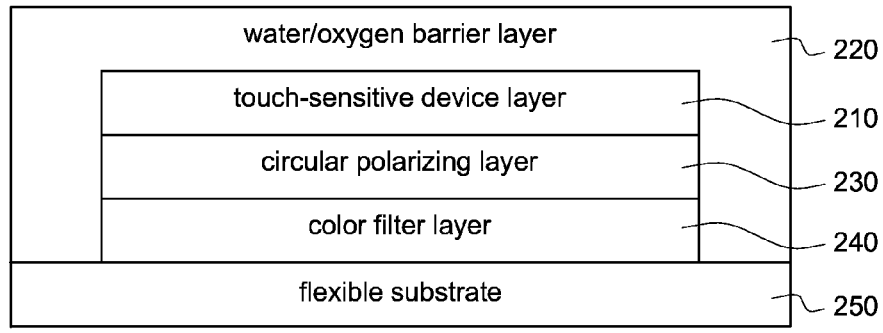

As indicated in FIG. 24D, the touch sensing film structure 121 comprises a touch-sensitive device layer 210, a water/oxygen barrier layer 220, a circular polarizing layer 230, a color filter layer 240 and a flexible substrate 250. The water/oxygen barrier layer 220 encapsulates the touch-sensitive device layer 210, the circular polarizing layer 230, the color filter layer 240 or a multi-function layer (not illustrated) formed by integrating one of the circular polarizing layer 230 and the color filter layer 240 with the touch-sensitive device layer 210 or a multi-function layer (not illustrated) formed by integrating the circular polarizing layer 230 with the color filter layer 240. Then, the above layers further stack with the flexible substrate 250 to avoid water and/or oxygen infiltrating to the touch sensing film structure 121 via the side surfaces of the touch-sensitive device layer 210, the circular polarizing layer 230 and/or the color filter layer 240.

Figure 24E:
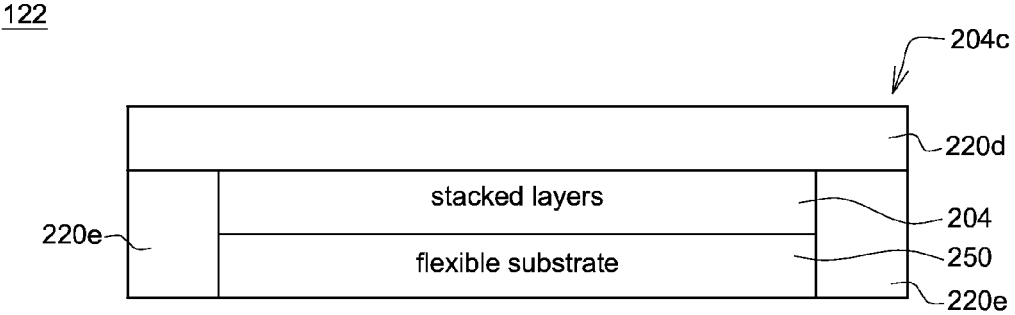
FIGS. 24E~24H respectively are schematic diagrams of a touch sensing film structure whose barrier layer being an inverse U-shaped structure or a loop structure.

As indicated in FIG. 24E, which illustrates a touch sensing film structure 122 having an inverse U-shaped structure 204c. The inverse U-shaped structure 204c comprises a top water/oxygen barrier layer 220d and a peripheral water/oxygen barrier layer 220e. The top water/oxygen barrier layer 220d covers a top side of stacked layers 204 according to any type of stacked structures illustrated from the first embodiment to the twentieth embodiment and the peripheral water/oxygen barrier layer 220e. The peripheral water/oxygen barrier layer 220e covers around the stacked layers 204 and the flexible substrate 250 to avoid water and/or oxygen infiltrating via the top side and lateral sides of the stacked layers 204 and the flexible substrate 250.

Figure 24F:
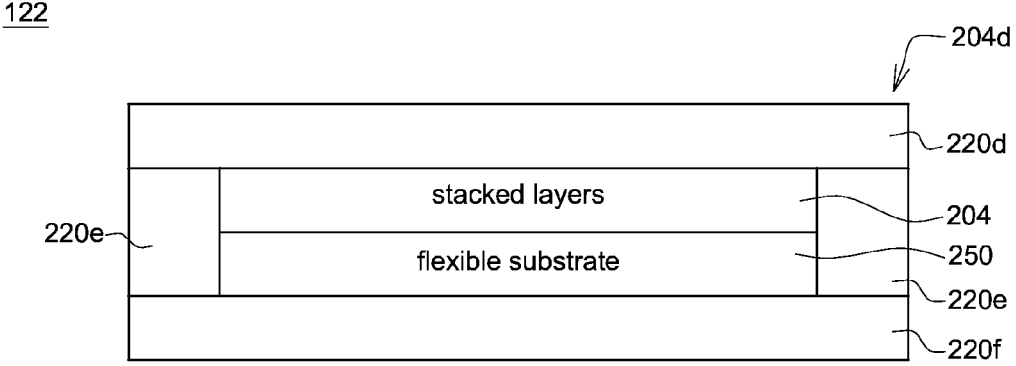

As indicated in FIG. 24F, which illustrates a touch sensing film structure 122 having a loop barrier structure 204d. The loop barrier structure 204d comprises a top water/oxygen barrier layer 220d, a peripheral water/oxygen barrier layer 220e and a bottom water/oxygen barrier layer 220f. The bottom water/oxygen barrier layer 220f is disposed under a bottom side of the flexible substrate 250 to avoid water and/or oxygen infiltrating via the bottom side of the flexible substrate 250.

Figure 24G:
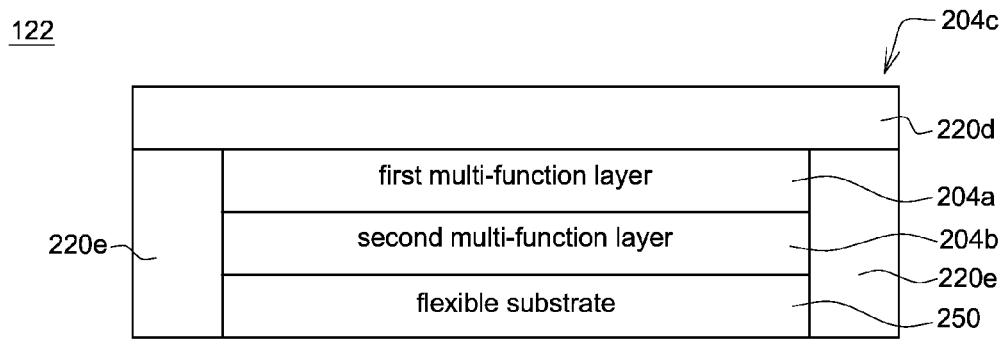

As indicated in FIG. 24G, the touch sensing film structure 122 comprises a first multi-function layer 204a, a second multi-function layer 204b, a flexible substrate 250 and an inverse U-shaped structure 204c. The inverse U-shaped structure 204c comprises a top water/oxygen barrier layer 220d and a peripheral water/oxygen barrier layer 220e. The top water/oxygen barrier layer 220d covers a top side of the first multi-function layer 204a according to any type of configurations illustrated in the twentieth embodiment and the peripheral water/oxygen barrier layer 220e. The peripheral water/oxygen barrier layer 220e covers around the first multi-function layer 204a, the second multi-function layer 204b and the flexible substrate 250 according to any one of configurations illustrated above to avoid water and/or oxygen infiltrating via the top side and lateral sides of the first multi-function layer 204a, the second multi-function layer 204b and the flexible substrate 250.

Figure 24H:
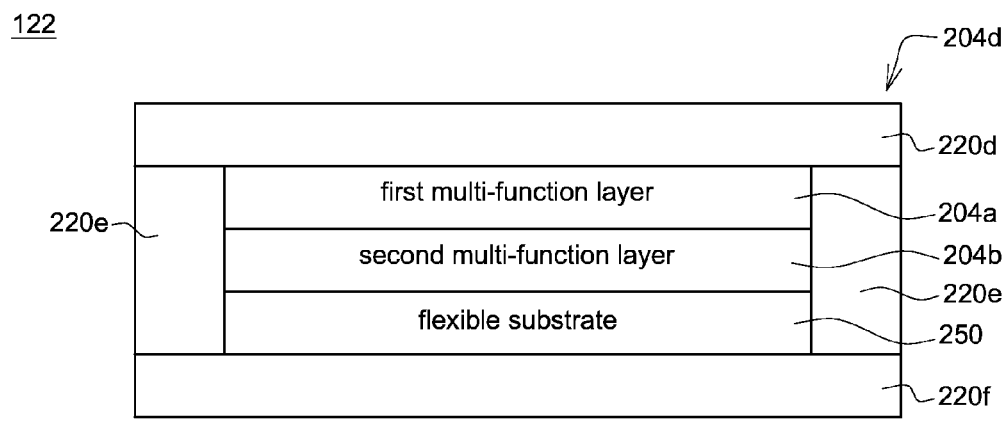

As indicated in FIG. 24H, the loop barrier structure 204d comprises a top water/oxygen barrier layer 220d, a peripheral water/oxygen barrier layer 220e and a bottom water/oxygen barrier layer 220f. The bottom water/oxygen barrier layer 220f is disposed under a bottom side of the flexible substrate 250 to avoid water and/or oxygen infiltrating via the bottom side of the first multi-function layer 204a, the second multi-function layer 204b and the flexible substrate 250.

Twenty-Second Embodiment

Figure 25:
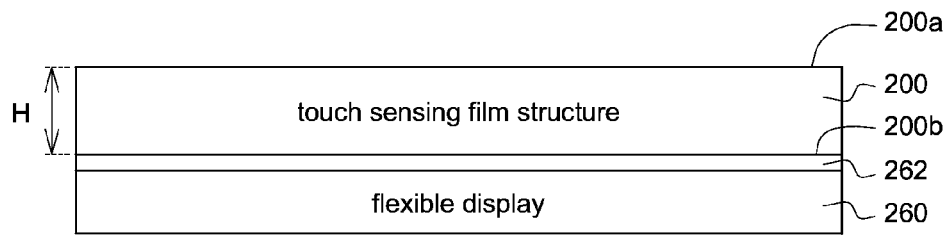
FIG. 25 is a schematic diagram of a touch sensing film structure disposed on a flexible display.

FIG. 25 is a schematic diagram of a touch sensing film structure 200 disposed on a flexible display 260. The touch sensing film structure 200 can adopt one of the touch sensing film structures 101~121 disclosed in any of the above embodiments. The touch sensing film structure 200 is disposed on the flexible display 260 with the front surface 200a or the back surface 200b facing the flexible display 260. The water/oxygen barrier layer 220 can be an inverse U-shaped structure to avoid water/oxygen filtrating to the flexible display 260 via stacked layers and the flexible substrate 250.

The touch sensing film structure 200 can be directly bonded on the flexible display 260 through one adhesive layer 262 only. Since there is no need to bond each layer by using adhesive, the problem of poor yield rate in bonding each layer can thus be resolved. In an embodiment, the touch sensing film structure 200 can be two, three, four or five-layered structure formed by stacking the touch-sensitive device layer 210, the water/oxygen barrier layer 220, the circular polarizing layer 230 and/or the color filter layer 240 with the flexible substrate 250. Since the touch sensing film structure 200 does not require any adhesive layers, the thickness H of the touch sensing film structure 200 can thus be reduced. For instance, the thickness H can be smaller than 100 μm. In an embodiment, the thickness H can be smaller than 50 μm.

The touch sensing film structure disclosed in above embodiments can be used in a flexible display to form a super-thin multi-function flexible touch sensing film structure. For instance, the flexible display, such as a white light organic light emitting diode (OLED) display, is formed by integrating a touch-sensitive device layer, a water/oxygen barrier layer, a color filter layer and a circular polarizing layer, and possesses touch-sensitive, water/oxygen barrier, ambient light shielding (such as anti-glare) and color light filtering functions. Besides, the flexible display, such as a color OLED display, is formed by integrating a touch-sensitive device layer, a water/oxygen barrier layer and a circular polarizing layer, and possesses color displaying, touch-sensitive, water/oxygen barrier, ambient light shielding (such as anti-glare) functions.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch sensing film structure, comprising:
 a touch-sensitive device layer;
 a water/oxygen barrier layer integrated with the touch-sensitive device layer to form a multi-function layer, wherein the water/oxygen barrier layer comprises a top water/oxygen barrier layer and a peripheral water/oxygen barrier layer, respectively covering a top side and lateral sides of the touch-sensitive device layer; and
 a flexible substrate stacked with the multi-function layer.

2. A touch sensing film structure, comprising:
 a touch-sensitive device layer;
 a water/oxygen barrier layer integrated with the touch-sensitive device layer to form a multi-function layer; and
 a flexible substrate stacked with the multi-function layer; and a top water/oxygen barrier layer and a peripheral water/oxygen barrier layer, respectively covering a top side and lateral sides of the touch-sensitive device layer, the water/oxygen barrier layer and the flexible substrate.

3. The touch sensing film structure according to claim 2, further comprising a bottom water/oxygen barrier layer disposed on a bottom side of the touch-sensitive device layer, the water/oxygen barrier layer and the flexible substrate.

4. A touch sensing film structure, comprising:
a touch-sensitive device layer having a first surface and a second surface opposite to the first surface;
a water/oxygen barrier layer and a circular polarizing layer;
wherein, one of the water/oxygen barrier layer and the circular polarizing layer is formed on the first surface or the second surface or integrated with the touch-sensitive device layer to form a multi-function layer, or the circular polarizing layer is integrated with the water/oxygen barrier layer to form a multi-function layer; and
a flexible substrate stacked with the touch-sensitive device layer, the water/oxygen barrier layer and the circular polarizing layer or stacked with the multi-function layer.

5. The touch sensing film structure according to claim 4, further comprising a top water/oxygen barrier layer and a peripheral water/oxygen barrier layer, respectively covering a top side and lateral sides of the touch-sensitive device layer, the water/oxygen barrier layer, the circular polarizing layer and the flexible substrate.

6. The touch sensing film structure according to claim 5, further comprising a bottom water/oxygen barrier layer disposed under a bottom side of the touch-sensitive device layer, the water/oxygen barrier layer, the circular polarizing layer and the flexible substrate.

7. A touch sensing film structure, comprising:
a touch-sensitive device layer having a first surface and a second surface opposite to the first surface;
a water/oxygen barrier layer and a color filter layer;
wherein, one of the water/oxygen barrier layer and the color filter layer is formed on the first surface or the second surface or integrated with the touch-sensitive device layer to form a multi-function layer, or the water/oxygen barrier layer is integrated with the color filter layer to form a multi-function layer; and
a flexible substrate stacked with the touch-sensitive device layer, the water/oxygen barrier layer and the color filter layer or stacked with the multi-function layer.

8. The touch sensing film structure according to claim 7, further comprising a top water/oxygen barrier layer and a peripheral water/oxygen barrier layer, respectively covering a top side and lateral sides of the touch-sensitive device layer, the water/oxygen barrier layer, the color filter layer and the flexible substrate.

9. The touch sensing film structure according to claim 8, further comprising a bottom water/oxygen barrier layer disposed under a bottom side of the touch-sensitive device layer, the water/oxygen barrier layer, the color filter layer and the flexible substrate.

10. A touch sensing film structure, comprising:
a touch-sensitive device layer having a first surface and a second surface opposite to the first surface;
a water/oxygen barrier layer, a circular polarizing layer and a color filter layer;
wherein, one of the water/oxygen barrier layer, the circular polarizing layer and the color filter layer is formed on the first surface or the second surface or integrated with the touch-sensitive device layer to form a multi-function layer, or two of the water/oxygen barrier layer, the circular polarizing layer and the color filter layer are integrated to form a multi-function layer; and
a flexible substrate stacked with the touch-sensitive device layer, the water/oxygen barrier layer, the circular polarizing layer and the color filter layer or stacked with the multi-function layer.

11. The touch sensing film structure according to claim 10, further comprising a top water/oxygen barrier layer and a peripheral water/oxygen barrier layer, respectively covering a top side and lateral sides of the touch-sensitive device layer, the water/oxygen barrier layer, the circular polarizing layer, the color filter layer and the flexible substrate.

12. The touch sensing film structure according to claim 11, further comprising a bottom water/oxygen barrier layer disposed under a bottom side of the touch-sensitive device layer, the water/oxygen barrier layer, the circular polarizing layer, the color filter layer and the flexible substrate.

13. A touch sensing film structure, comprising:
a touch-sensitive device layer;
a water/oxygen barrier layer, a circular polarizing layer and a color filter layer;
wherein, two of the touch-sensitive device layer, the water/oxygen barrier layer, the circular polarizing layer and the color filter layer are integrated to form a first multi-function layer, and the other two are integrated to form a second multi-function layer, or three or all of the touch-sensitive device layer, the water/oxygen barrier layer, the circular polarizing layer and the color filter layer are integrated to form a multi-function layer; and
a flexible substrate stacked with the first multi-function layer and the second multi-function layer or stacked with the multi-function layer with three or all functions.

14. The touch sensing film structure according to claim 13, further comprising a top water/oxygen barrier layer and a peripheral water/oxygen barrier layer, respectively covering a top side and lateral sides of the touch-sensitive device layer, the water/oxygen barrier layer, the circular polarizing layer, the color filter layer and the flexible substrate.

15. The touch sensing film structure according to claim 14, further comprising a bottom water/oxygen barrier layer disposed under a bottom side of the touch-sensitive device layer, the water/oxygen barrier layer, the circular polarizing layer, the color filter layer and the flexible substrate.

16. A touch sensing film structure, comprising:
a touch-sensitive device layer having a first surface and a second surface opposite to the first surface;
a water/oxygen barrier layer formed on the first surface or the second surface, the water/oxygen barrier layer comprising a top water/oxygen barrier layer and a peripheral water/oxygen barrier layer respectively covering a top side and lateral sides of the touch-sensitive device layer; and
a flexible substrate stacked with the water/oxygen barrier layer and the touch-sensitive device layer.

\* \* \* \* \*